(12) United States Patent
Mock et al.

(10) Patent No.: US 12,146,727 B2
(45) Date of Patent: Nov. 19, 2024

(54) DETERRENT-DEVICE ACCESSORY ELECTROMAGNETIC-RADIATION-BASED ACTIVATION

(71) Applicant: Crosman Corporation, Bloomfield, NY (US)

(72) Inventors: Jeffrey W. Mock, Rochester, NY (US); John A. Kowalczyk, Jr., Fairport, NY (US); Robert J MacBlane, Farmington, NY (US)

(73) Assignee: Crosman Corporation, Bloomfield, NY (US)

( * ) Notice: Subject to any disclaimer, the term of this patent is extended or adjusted under 35 U.S.C. 154(b) by 0 days.

(21) Appl. No.: 18/072,265

(22) Filed: Nov. 30, 2022

(65) Prior Publication Data

US 2023/0175815 A1     Jun. 8, 2023

Related U.S. Application Data

(63) Continuation of application No. 17/259,813, filed as application No. PCT/US2019/041655 on Jul. 12, 2019, now Pat. No. 11,543,210.

(Continued)

(51) Int. Cl.
| F41G 1/35 | (2006.01) |
| F21V 8/00 | (2006.01) |
| F41G 11/00 | (2006.01) |

(52) U.S. Cl.
CPC ............. *F41G 1/35* (2013.01); *G02B 6/0008* (2013.01); *F41G 11/003* (2013.01)

(58) Field of Classification Search
CPC .... F41G 1/35; F41G 11/00; F21L 4/00; F21V 21/34; F21V 23/00
(Continued)

(56) References Cited

U.S. PATENT DOCUMENTS 5,255,916 A * 10/1993 Bleich .................... G01V 8/16
                                              273/127 R
7,260,910 B2 * 8/2007 Danielson ............... F41C 23/10
                                                  42/117

(Continued)

OTHER PUBLICATIONS

Chinese Office Action mailed Jul. 22, 2022 for Chinese Patent Application No. 201980057167.2, a foreign counterpart to U.S. Appl. No. 17/259,813, 15 pages.
(Continued)

*Primary Examiner* — Samir Abdosh
(74) *Attorney, Agent, or Firm* — Lee & Hayes, P.C.

(57) ABSTRACT

A kit includes a deterrent device, a grip activation system, and a housing supporting the grip activation system. The housing positions the grip activation system so that a sensing space of the grip activation system extends at least partly adjacent to a trigger guard of the deterrent device. The grip activation system includes an emitter configured to emit first electromagnetic radiation having a first wavelength; a detector configured to detect second electromagnetic radiation having the first wavelength; and a controller. The controller determines, based at least in part on the second electromagnetic radiation, that an object is present in the sensing space; and provides an activation signal to an activatable system in response to determining that the object is present in the sensing space. The activatable system can include a light source. Some examples include a housing, a grip activation system, and an activatable system.

20 Claims, 13 Drawing Sheets

Related U.S. Application Data

(60) Provisional application No. 62/697,107, filed on Jul. 12, 2018.

(58) Field of Classification Search
USPC ............ 42/114–117; 340/539.11; 434/11, 16
See application file for complete search history.

(56) References Cited

U.S. PATENT DOCUMENTS

| | | | | |
|---|---|---|---|---|
| 7,805,876 | B1* | 10/2010 | Danielson | F41G 11/004 42/117 |
| 8,256,154 | B2* | 9/2012 | Danielson | F41A 19/11 42/117 |
| 9,328,994 | B2* | 5/2016 | Hovsepian | F41G 1/35 |
| 9,658,022 | B1* | 5/2017 | Farrell | F41A 33/00 |
| 9,746,266 | B1* | 8/2017 | Barido | G05B 15/02 |
| 11,822,413 | B1* | 11/2023 | Owens | G06F 1/3287 |
| 2004/0016812 | A1* | 1/2004 | Schmidt | G06K 7/10 235/462.31 |
| 2008/0060246 | A1* | 3/2008 | Rozovsky | F41A 17/46 42/70.07 |
| 2013/0019510 | A1* | 1/2013 | Kemmerer | F41A 17/066 42/70.11 |
| 2015/0157269 | A1* | 6/2015 | Lisogurski | A61B 5/0295 600/301 |
| 2015/0187204 | A1* | 7/2015 | Houde-Walter | F41A 17/063 340/539.11 |
| 2015/0210249 | A1* | 7/2015 | Morris | B60R 25/04 701/1 |
| 2015/0227310 | A1* | 8/2015 | Imai | G06F 3/0418 345/174 |
| 2015/0247692 | A1* | 9/2015 | Harvey | F41A 17/00 42/70.11 |
| 2017/0010067 | A1* | 1/2017 | Cosso | F41G 1/35 |
| 2017/0160041 | A1* | 6/2017 | Stewart | F41C 23/22 |
| 2017/0248388 | A1* | 8/2017 | Young | F41A 17/063 |
| 2017/0296183 | A1* | 10/2017 | Shelton, IV | A61B 17/072 |
| 2018/0058805 | A1* | 3/2018 | Mock | F41G 1/35 |
| 2018/0087757 | A1* | 3/2018 | Mock | F21V 23/003 |
| 2018/0172401 | A1* | 6/2018 | Mock | G01R 15/16 |
| 2021/0341257 | A1* | 11/2021 | Mock | G02B 6/0008 |
| 2022/0341702 | A1* | 10/2022 | Owens | F41A 17/066 |
| 2024/0027158 | A1* | 1/2024 | Pellegrini | F41A 17/20 |
| 2024/0027159 | A1* | 1/2024 | Pellegrini | F41A 19/59 |

OTHER PUBLICATIONS

Partial Supplementary European Search Report mailed Mar. 16, 2022 for European Patent Application No. 19834369.1, 17 pages.
Extended European Search Report mailed Jun. 20, 2022 for European Patent Application No. 19834369.1, 16 pages.
Invitation to Pay Fees dtd Aug. 30, 2019 for PCT Application No. PCT/US19/41655, "Deterrent-Device Accessory Electromagnetic-Radiation-Based Activation", 2 pages.
Office Action for U.S. Appl. No. 17/259,813, mailed May 12, 2022, Mock, "Deterrent-Device Accessory Electromagnetic-Radiation-Based Activation", 5 pages.
PCT Search Report and Written Opinion mailed on Nov. 18, 2019 for PCT Application No. PCT/US2019/041655, 15 pages.
Office Action mailed Feb. 24, 2023 for Chinese application No. 201980057167.2, Jeffery W. Mock, "Deterrent-Device Accessory Electromagnetic-Radiation-Based Activation", 15 pages; Application Number.

* cited by examiner

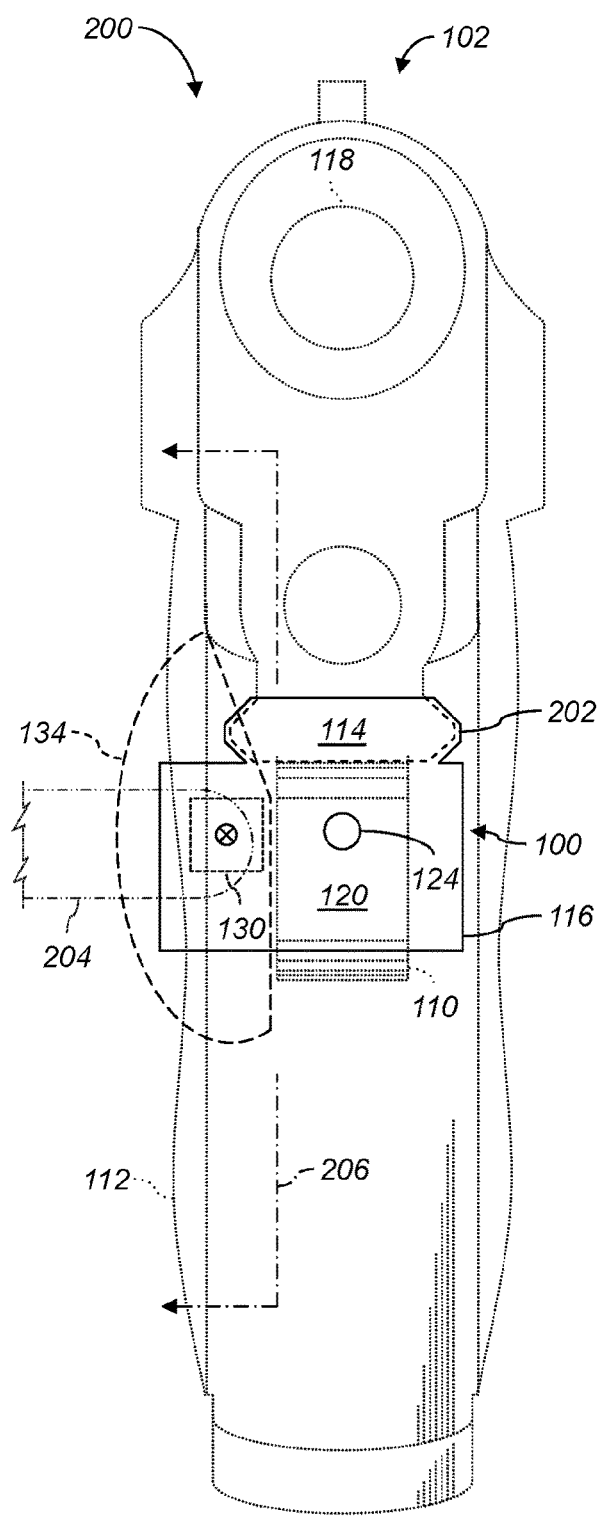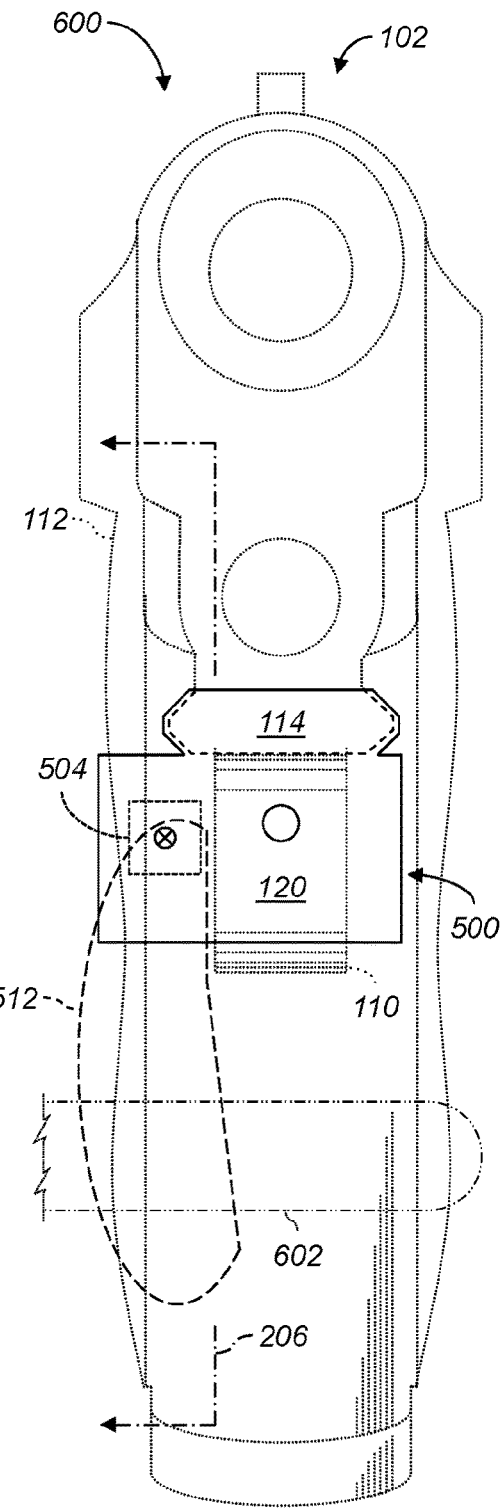
FIG. 2
FIG. 6

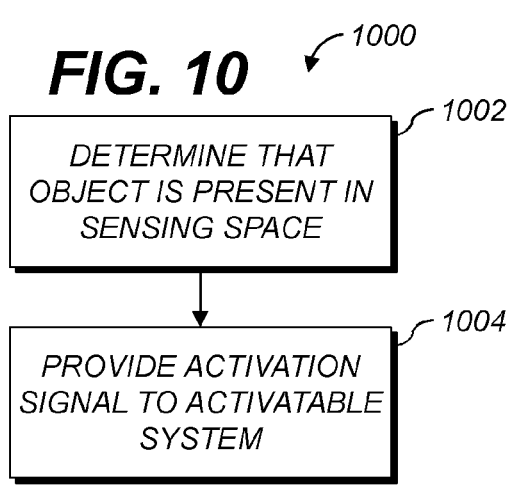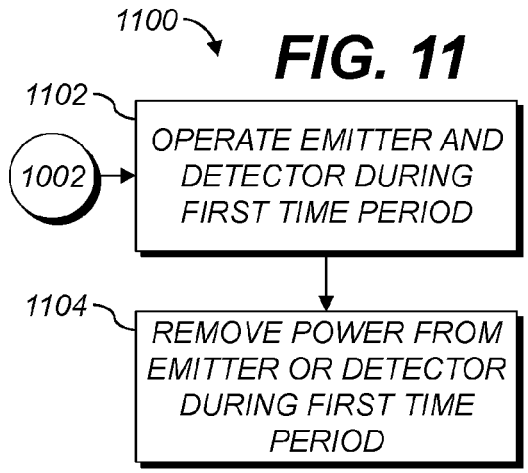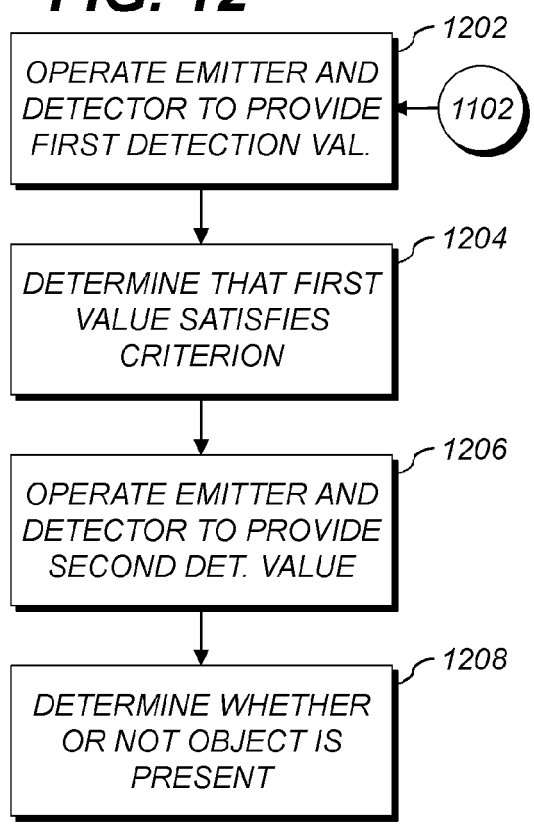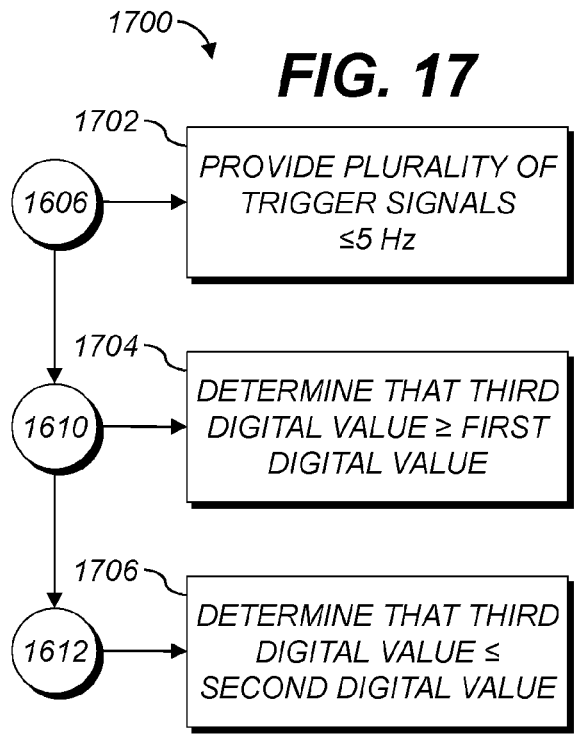

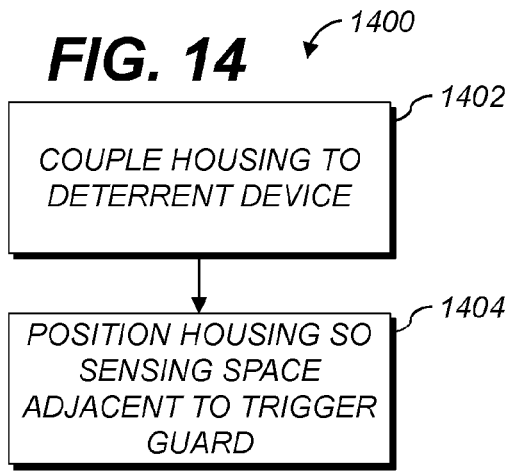
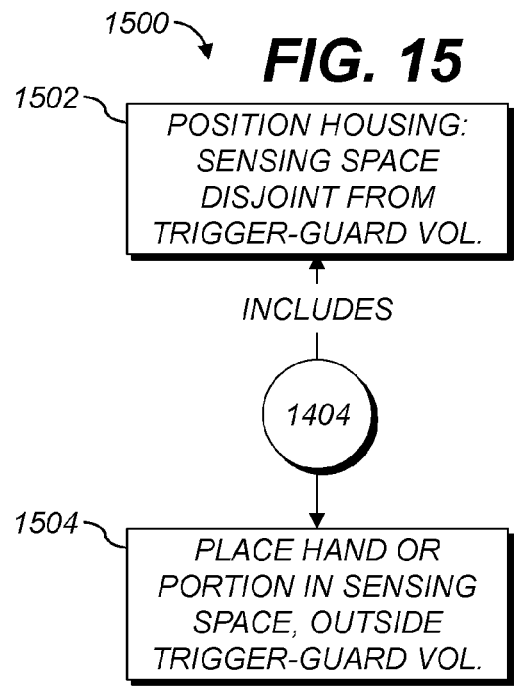
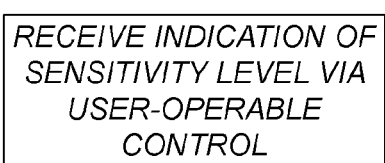
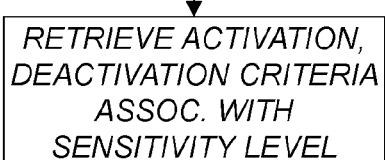
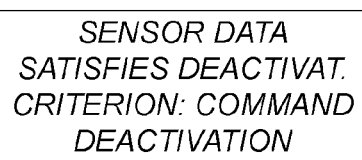

DETERRENT-DEVICE ACCESSORY ELECTROMAGNETIC-RADIATION-BASED ACTIVATION

CROSS-REFERENCE TO RELATED APPLICATION

This application is a continuation of and claims priority to U.S. application Ser. No. 17/259,813, filed Jan. 12, 2021, which is a 35 U.S.C. § 371 National Stage Entry of, and claims priority to, International Application No. PCT/US2019/041655, filed Jul. 12, 2019, entitled "Deterrent-Device Accessory Electromagnetic-Radiation-Based Activation," which is a nonprovisional application of, and claims priority to and the benefit of, U.S. Patent Application Ser. No. 62/697,107, filed Jul. 12, 2018, and entitled "Deterrent-Device Accessory Switchless Electromagnetic-Radiation Activation." The disclosures of the above applications are incorporated herein by reference in their entirety.

TECHNICAL FIELD

The present application relates to accessories and mechanisms for use with firearms and other deterrent devices, and methods for activating such accessories and mechanisms.

BACKGROUND

Electronic accessories are often used with deterrent devices such as firearms or bows, or with simulated deterrent devices (e.g., training devices). Examples of electronic accessories include laser and light devices. There are various ways of joining such an accessory to a deterrent device and various ways of activating such an accessory when needed. One ongoing challenge is that of providing for automatic activation of the electronic systems when the deterrent device is needed (or is shortly to be used) in a manner that does so without distracting the user of the deterrent device. Some schemes include placing a pressure switch on a grip such that a gripping force of the user applies pressure to activate the switch. However, the need to apply such pressure can be a distraction to the user.

Additionally, many electronic systems today are mounted to rail systems that may be some distance from a gripping surface of a deterrent device. Rail mounted electronic devices therefore present a challenge. One approach to this is to provide a rail mounted mechanical structure that provides an electrical path from the rail-mounted device to a switch in a gripped portion of a deterrent device. However, this has the disadvantages of other pressure-switch schemes. Another solution is the incorporation of an electronic system that can sense a magnet positioned in a holster and that activates when the deterrent device is removed from the holster. This solution requires customized holsters and only works in a holstered situation.

BRIEF DESCRIPTION OF THE DRAWINGS

Objects, features, and advantages of various aspects will become more apparent when taken in conjunction with the following description and drawings. Identical reference numerals have been used, where possible, to designate identical features that are common to the figures. The attached drawings are for purposes of illustration and are not necessarily to scale.

FIG. 2 is a front elevation of an accessory for a deterrent device. A deterrent device is also shown for ease of reference.

FIG. 6 is a front elevation of an accessory for a deterrent device. A deterrent device is also shown for ease of reference.

FIG. 10 is a flowchart of an example process for activating an activatable system.

FIG. 11 is a flowchart of an example process for controlling a grip-activation system.

FIG. 12 is a flowchart of example processes for detecting an object in a sensing space.

FIG. 14 is a flowchart of an example process for preparing a deterrent device for use.

FIG. 15 is a flowchart of example processes for configuring or operating a deterrent device.

FIG. 16 is a flowchart of an example process for activating an activatable system based at least in part on a sensitivity level.

FIG. 17 is a flowchart of example processes for activating an activatable system.

DETAILED DESCRIPTION

Overview

For use with a deterrent device having a rail, an accessory is provided that has an activatable system and an electronic controller for activating the activatable system. One example of the activatable system is an aiming laser that projects a beam down range to indicate where the deterrent device is being pointed. Another example is a lamp to illuminate a target. Other examples include sensors or non-lethal deterrent devices.

In some examples, an infrared (IR) emitter/receiver system is incorporated into a rail-mounted accessory. The IR system emits a beam into a volume of space that will be occupied by a portion of a hand of the user when gripping the deterrent device. Reflected IR light indicates presence of the object. In some examples, the detection area is limited to an area where a portion of a gripping hand might be expected to be found. This can conserve energy while permitting regular tests for presence (measurement sequences) (e.g., at 2 Hz, 4 Hz, <5 Hz, <10 Hz, <20 Hz, <50 Hz, or <100 Hz). In some examples, the spatial region in which a hand can be detected is spaced apart from the sensor electronics. In some examples, the spatial region in which a hand can be detected is separate from a volume defined by a trigger guard of the deterrent device.

While the discussion herein, for brevity, generally relates to IR emission, other wavelengths of light can additionally or alternatively be used. In some examples, the wavelengths or power levels of light emitted by emitter 136 are not visible to the unaided human eye.

Subsection headers in this Detailed Description are solely for convenience in reading. Some examples include features from only one subsection. Some examples include features from more than one subsection.

Illustrative Configurations and Operations

Figure 1:
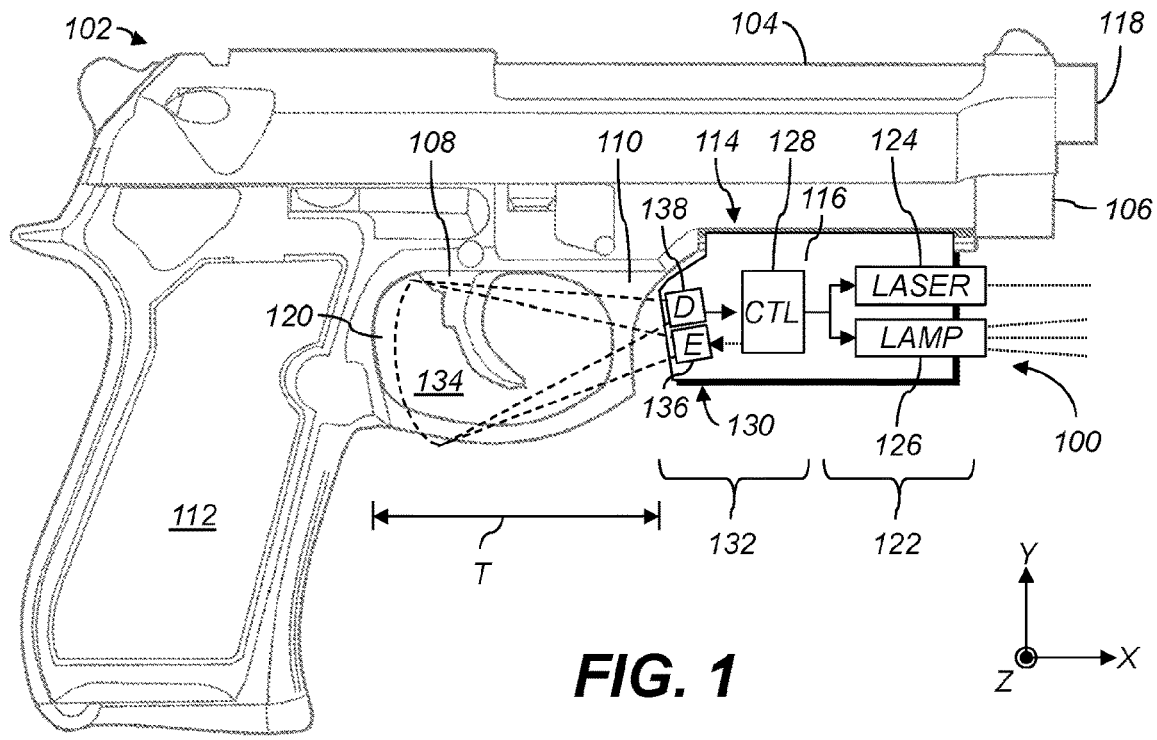
FIG. 1 is a side elevation of an accessory for a deterrent device. A deterrent device is also shown for ease of reference.

FIG. 1 is a side elevation of an accessory 100 for a deterrent device 102. Deterrent device 102 is illustrated as a firearm. Accessory 100 has a grip activation system, and is shown mounted on deterrent device 102. Deterrent device 102 includes, in part, a barrel 104, a frame 106, a trigger 108, and a trigger guard 110 at least partly surrounding trigger 108. Deterrent device 102 also includes a grip 112 and a rail 114 mounted to or included in frame 106. Example rails 114 include Weaver, Picatinny, NATO, KEYMOD, or M-LOK rails. In this embodiment, accessory 100 includes a housing 116 that is shown engaging rail 114. However, accessory 100 can be cooperatively engaged with any portion of deterrent device 102 and may be incorporated within deterrent device 102.

For purposes of description, the term "longitudinal" means the dimensions along the direction of the barrel 104 (±X). The term "width" means the dimension along a "lateral" direction transverse to the axis of the barrel 104 and to the long axis of the grip 112 (±Z). The term "forward" means nearer to or towards a muzzle 118 of the barrel 104 (+X). The term "rearward" means further from or away from the muzzle 118 (−X). The term "below" means lower than, in the intended operating orientation of the deterrent device 102 (−Y). The term "above" means higher than, in the intended operating orientation of the deterrent device 102 (+Y). The Y axis can be referred to as an "elevational" axis.

In the illustrated example, trigger guard 110 encloses a volume 120. Volume 120 can include, e.g., all points from which a test ray reaches trigger 108 or trigger guard 110 before reaching any other part of deterrent device 102. The test ray can have direction X≥0, Y≤0, Z=0, and at least one of X or Y nonzero. Distance T is measured from the rear (−X) of accessory 100 (e.g., a rear surface of housing 116) to the rear of volume 120.

Accessory 100 includes at least one activatable system 122. The illustrated example accessory 100 includes two activatable systems 122: (1) a laser module 124 for selectively emitting a beam of radiation, such as coherent radiation, along a first optical axis, and (2) a lamp 126 for selectively emitting a beam of radiation, such as non-coherent radiation, along a second optical axis. Laser module 124 can include any of a variety of lasers such as, but not limited to infrared lasers, or lasers emitting at 520-540 nm, 532 nm, 635 nm, 650 nm, or 850 nm. It is understood that the wavelengths noted above are merely examples, and that in some embodiments, the laser module 124 may include one or more light sources emitting radiation at wavelengths greater than or less than the wavelengths noted above. Lamp 126 can include an incandescent, halogen, or fluorescent light source; an LED or OLED emitter, array, or panel (e.g., an infrared or other non-visible LED); or other light sources that emit electromagnetic radiation that is at least: (1) substantially uncollimated when emitted; (2) substantially incoherent when emitted; or (3) broad-band, e.g., having a linewidth greater than 10 GHz. Accessory 100 can include batteries, power supplies, or other components providing energy to operate activatable system(s) 122. The batteries can be any of a variety of commercially available batteries, either rechargeable or disposable. Other examples can omit laser module 124, omit lamp 126, or include other activatable systems 122 that are selectively activated.

Controller 128 determines operation of at least one activatable system 122, e.g., laser module 124 or lamp 126. Controller 128 can include a microprocessor or other components such as described herein with reference to FIG. 4. Controller 128 is connected to the power supply and includes an activation sensor 130. Controller 128 selectively operates, or supplies power to, the activatable system 122 based on input from the activation sensor 130. Activation sensor 130 can take the form of any devices, apparatus, or mechanism that can sense a condition indicating that a change of state of an operating condition of accessory 100 is to be made. Without limitation, such an activation sensor can take the form of an electro-mechanical switch, electro-optical switch or any kind of optical, mechanical, electro-mechanical, electromagnetic, electro-optic, electrical, sonic, sensory or sensing system, or other transducer known for sensing physical conditions.

In some examples, accessory 100 can include other components permitting a user of deterrent device 102 to direct controller 128 to activate an activatable system 122. Such components can include, e.g., switches on or protruding rearward from housing 116 of accessory 100. Such an optional control arrangement allows a user to adjust operation of accessory 100 using finger contact with accessory 100. However, in certain circumstances a user may in addition wish to have the option to change an operation of a accessory 100 so that accessory 100 activates based upon whether or not the user is gripping deterrent device 102. This may present a challenge insofar as, in the illustrated configuration of FIGS. 1 and 2, housing 116 of accessory 100 positions an electronic system such as laser module 124, controller 128, and actuation sensor 130 forward of trigger guard 110 of deterrent device 102 while the grip 112—and, therefore, the user's hand, during normal operation—is to the rear of trigger guard 110.

Figure 18:
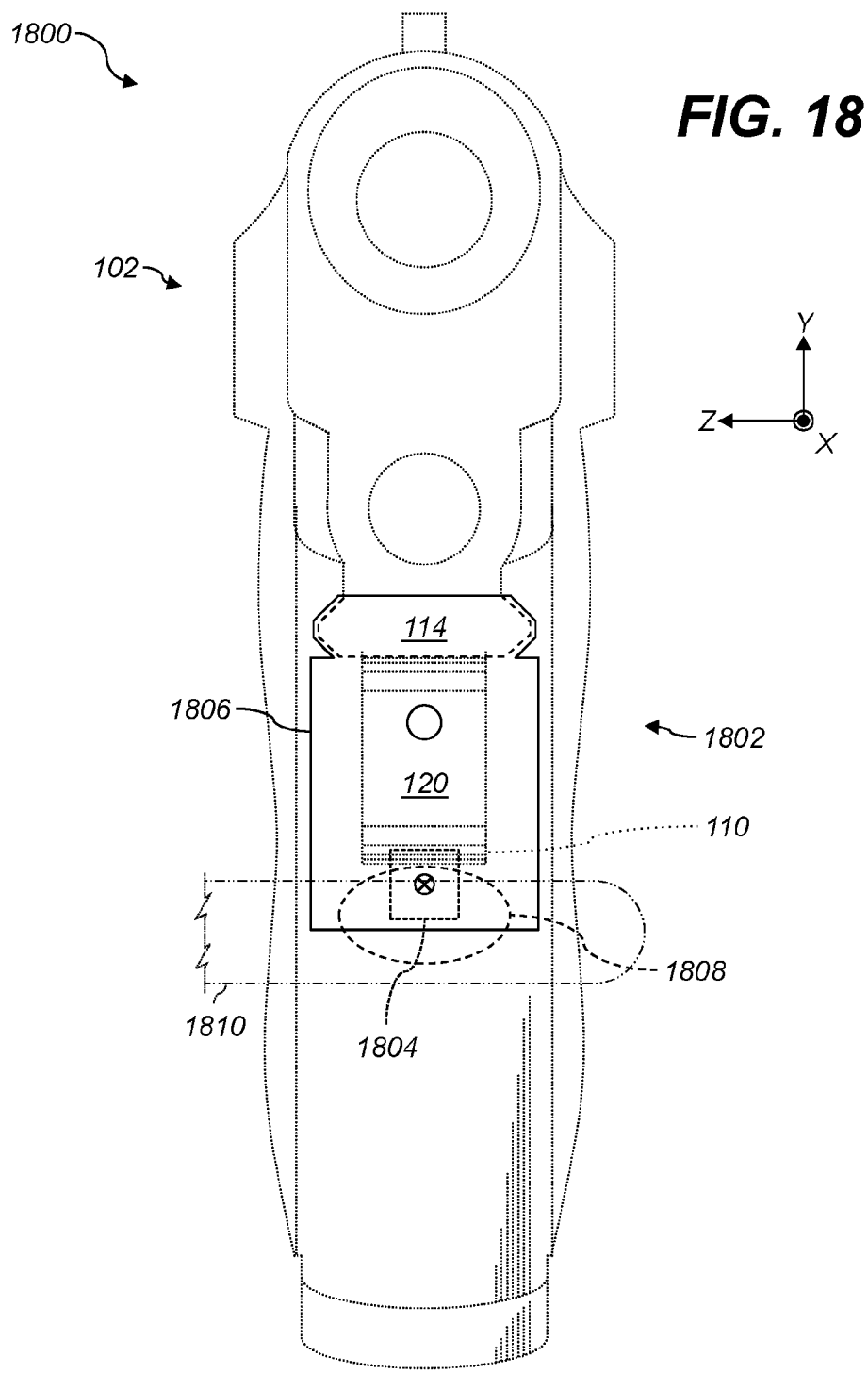
FIG. 18 is a front elevation of an accessory for a deterrent device.

In the illustrated configuration of FIGS. 1 and 2, this challenge is met in part by a grip activation system 132 including controller 128 and activation sensor 130. Housing 116 positions grip activation system 132 to detect the presence of a user's hand or finger(s) (for brevity, an "object") in a sensing space 134 extending at least partly rearward from activation sensor 130. Sensing space 134 can include a region of space where a part of the body of the user of the deterrent device 102 is expected to be found when using the deterrent device 102. For example, sensing space 134 can extend at least partly adjacent to trigger guard 110 of deterrent device 102. In the example of FIG. 2, sensing space 134 is at least partly laterally adjacent to trigger guard 110. In the example of FIG. 18, sensing space 134 is at least partly elevationally adjacent to trigger guard 110. In some examples, sensing space 134 is at least partly adjacent to trigger guard 110 both laterally and elevationally, or exactly one or at most two of laterally, longitudinally, and elevationally.

In some examples, no physical contact is required between any part of the user's body and any part of activation sensor 130. Instead, activation sensor 130 can perform non-contact detection, e.g., via emission and detection of infrared (IR) or other wavelengths of light. IR wavelengths can be between, e.g., 650 nm and 1 mm, or between 650 nm and 15 µm. It is understood that the wavelengths noted above are merely examples, and that in some embodiments, wavelengths greater than or less than the wavelengths noted above may be used in the manner described herein. For example, visible light, ultraviolet light, and/or wavelengths up to and including midwave and/or longwave infrared may be used. Controller 128 is responsive to signals from activation sensor 130 to determine, based upon these signals, whether to change operation of laser module 124 or other activatable systems 122 that may be incorporated in accessory 100.

The illustrated activation sensor 130 includes an IR emitter 136 arranged to illuminate the sensing space 134, and an IR detector 138 arranged to detect IR light reflected or otherwise redirected by object(s) in the sensing space 134. The activation sensor 130 can include, e.g., a TMD2772 integrated proximity-detection sensor by AMS AG (Austria) that includes IR emitter 136 and IR detector 138, and has a 250 field of view, or another sensor having similar components and operating characteristics. Additionally or alternatively, activation sensor 130 can include an emitter 136 and a detector 138 in separate packages. For brevity, "light source" refers herein to laser module 124, other lasers, lamp 126, other lamps, and other sources of IR or visible electromagnetic radiation, e.g., 380 nm-1 mm wavelength, but excludes emitter 136 or other emitters of the grip activation system 132.

In some examples, activation sensor 130 can include electronics or programming for sunlight rejection or other ambient-light rejection, or for otherwise determining that the detected radiation corresponds to the emitted radiation, e.g., because the emitted radiation reflected off an object and then was detected. Examples of such rejection or determination can include producing time-varying IR emission, and filtering out detected IR that does not follow the transmitted variations. Other examples can include reading an ambient light level both before and after emitting IR, and determining the output value using correlated double sampling (CDS). The ambient level can be read, e.g., using detector 138 or a different detector. The ambient level can be read in the same optical band at which emitter 136 emits, or in a different optical band (e.g., IR emission and visible-light ambient detection). Still other examples can include concurrently measuring illumination with both a broadband detector and detector sensitive to only the light to be disregarded, and subtracting the measurement by the latter from the measurement by the former.

IR detector 138 can provide sensor data to controller 128 indicating whether an object has been detected within sensing space 134. In some examples, as indicated by the stippled arrow, controller 128 triggers emitter 136 to operate. In other examples, activation sensor 130 includes internal electronics to trigger emitter 136, e.g., in response to configuration values provided by controller 128 or a configuration memory (e.g., configuration memory 410). For example, activation sensor 130 can be configured to operate emitter 136 automatically at a frequency specified in a configuration memory. Examples of sensor data and controller processing are described herein with reference to FIG. 4 and processor 402.

Some accessories 100 may go for long periods without use, e.g., during storage. However, the user may expect an activatable system 122 in accessory 100 to be fully operational without advance notice. This may present a further challenge, insofar as a battery-powered grip activation system 132 must be prepared to detect an object (e.g., a user's grip) with very low latency, and yet must do so without draining the battery so rapidly that the activatable system 122 becomes wholly or partly non-functional due to lack of power.

In the illustrated example, sensing space 134 extends towards, but substantially not to, grip 112. This permits detecting objects near a trigger 108 of the deterrent device 102, or near trigger guard 110, without mistakenly detecting a hand on the grip as a request to activate an activatable device. In some examples, the depth (distance front-to-rear) of sensing space 134, is determined at least partly by the optical configuration of activation sensor 130 (e.g., as discussed herein with reference to FIG. 3). In some examples, the height, width, and shape of the sensing space are also determined by the optical configuration of activation sensor 130. In some examples, the depth of sensing space 134 is determined at least partly by configuration parameters of the activation sensor 130 or the controller 128 (e.g., as discussed herein with reference to FIG. 4). Other examples of sensing space 134 are described herein with reference to FIGS. 5 and 6. In some examples, a main axis of sensing space 134 extends in a direction satisfying X<0, Y<0, Z≈0 (but note that direction Z≈0 does not require that the origin of the main axis has Z≈0).

In the illustrated example, activation sensor 130 is oriented downward and rearward with respect to the axis of barrel 104 (the horizontal, in the figure). For example, activation sensor 130 can be inclined ~20° downward from the horizontal. Some configurations can include a set screw or other mechanism for adjusting the angle of inclination (angle B, FIG. 3); other configurations have a fixed angle of inclination. In some examples, housing 116 is approximately 1.7' long (front to back). In some examples, accessory 100 includes other components not shown, e.g., buttons (such as KMS-233 side-actuated switches by C&K COMPONENTS, or SKRT switches by ALPS) for activation or programming, or battery holders (e.g., for ⅓N or CR2032 batteries, ×1, ×2, or another number).

FIG. 2 shows a front elevation 200 of the example of FIG. 1. Accessory 100 is mounted to rail 114 (here, a Picatinny rail) of deterrent device 102 via a mounting portion 202 of housing 116. Mounting portion 202 can include, e.g., two guide rails configured to slide over rail 114, or a nut or other feature to retain housing 116 in position with respect to trigger guard 110 or grip 112. Laser module 124 (and lamp 126, omitted for clarity) is arranged in housing 116 to illuminate areas or objects forward of the deterrent device 102 when in use. Housing 116 extends farther to the right side of deterrent device 102 (farther left, in the figure) than does trigger guard 110. This permits activation sensor 130 to detect objects outside the trigger guard. In the illustrated example, activation sensor 130 detects objects on the right side of deterrent device 102 (the left side of the figure). Since a user's finger generally extends past the trigger guard on both the left and the right when deterrent device 102 is in use, detection on only one side can nevertheless permit activation by both left- and right-handed users. Activation sensor 130 can alternatively extend farther toward the left side of deterrent device 102 (the right side of the figure). Some example accessories 100 include two activation sensors 130, one on the left side of the figure and one on the right side of the figure. Other examples are described herein with reference to FIG. 6.

In the illustrated example, activation sensor 130 detects rearward of housing 116, past the plane of the figure, as indicated by the "⊗" mark. Sensing space 134 extends backwards along the right side of deterrent device 102 (as shown in FIG. 1) in order to detect object 204, e.g., a finger of a hand or a glove. In the illustrated example, sensing space 134 is spaced apart from the volume 120 enclosed by trigger guard 110. Therefore, activation sensor 130 can detect object 204 before object 204 reaches trigger guard 110 or enters volume 120. In some examples, this can permit detecting object 204 and activating the activatable system 122 before the user is ready to fire the deterrent device. Additionally or alternatively, this can increase the amount of time available to detect object 204 between when the user begins to grip deterrent device 102 and when the user is ready to fire. Increasing this amount of time can permit reducing the frequency of attempts to detect object 204, which can increase the battery life of accessory 100. Examples are discussed herein, e.g., with reference to FIG. 4.

In some examples, sensing space 134 can be positioned predominantly to one side of deterrent device 102. This can reduce false activations that might arise in cases where deterrent device 102 is positioned too closely to parts of a human body, e.g., during holstering or transport. For example, for right-handed shooting, sensing space 134 can be positioned to the right side of deterrent device 102 for strong-side hip or front-side ("appendix") carry, or to the left side of deterrent device 102 for small-of-back carry.

In various examples, sensing space 134 has at least one of the following relationships with volume 120: is disjoint from; abuts; or does not include more than, e.g., 5% or 10% of. In some examples, sensing space 134 does not include more than, e.g., 5% or 10% of that portion of volume 120 at and ahead of trigger 108. Sensing space 134 may overlap with portions of volume 120 behind trigger 108, in some examples. In some examples, sensing space 134 can be substantially conical (including elliptical, truncated, or truncated elliptical cones, and likewise throughout) in shape. In some examples, at least a portion of sensing space 134 is within 2 mm of at least a portion of trigger guard 110 in a lateral direction (e.g., ±Z). In some examples, a test ray from emitter 136 in the −X (rearward) direction reaches frame 106 or grip 112 before striking any portion of trigger guard 110. In some examples, sensing space 134 extends at least partly adjacent to trigger guard 110, e.g., in one of the above-listed relationships.

In some examples, housing 116 is configured so that mounting portion 202, when mounted on rail 114 or otherwise joined to deterrent device 102, positions grip activation system 132 so that sensing space 134 extends at least partly laterally adjacent to trigger guard 110. For example, rail 114 is often centered laterally. Housing 116 can therefore be configured so that grip activation system 132 (or, alternatively, emitter 136 and detector 138) is off-center laterally. In some examples, a specific housing 116 can be designed for a specific model of deterrent device 102 based on measurements or drawings of the trigger guard 110 or other components of that model. Housing 116 can be configured to offset mounting portion 202 laterally from grip activation system 132 (or, alternatively, emitter 136 and detector 138) to the extent required to permit at least one of the above-listed relationships to hold when mounting portion 202 is joined to deterrent device 102.

In some examples, such as that shown, sensing space 134 can have a shape that is substantially the intersection of a portion of a cone (or truncated cone) and one or more half-spaces, e.g., defined by a cap of volume 120 or other geometrical attributes of trigger guard 110. In the illustrated example, sensing space 134 is substantially an elliptical cone truncated at the front and rear. However, sensing space 134 is also constrained at least within half-space 206 defined by the right edge of trigger guard 110.

In some examples, accessory 100 is sized so that the extent along the Z axis thereof is no greater than a width of deterrent device 102 or frame 106. Thus, deterrent device 102 can be holstered even while accessory 100 is attached. For example, for use with the RUGER LCP sold by Sturm, Ruger & Co., Inc., Southport, Conn., USA, having a frame width of approximately 0.82 inches, the accessory 100 can extend along the Z axis approximately 0.74 inches, or less.

Figure 3:
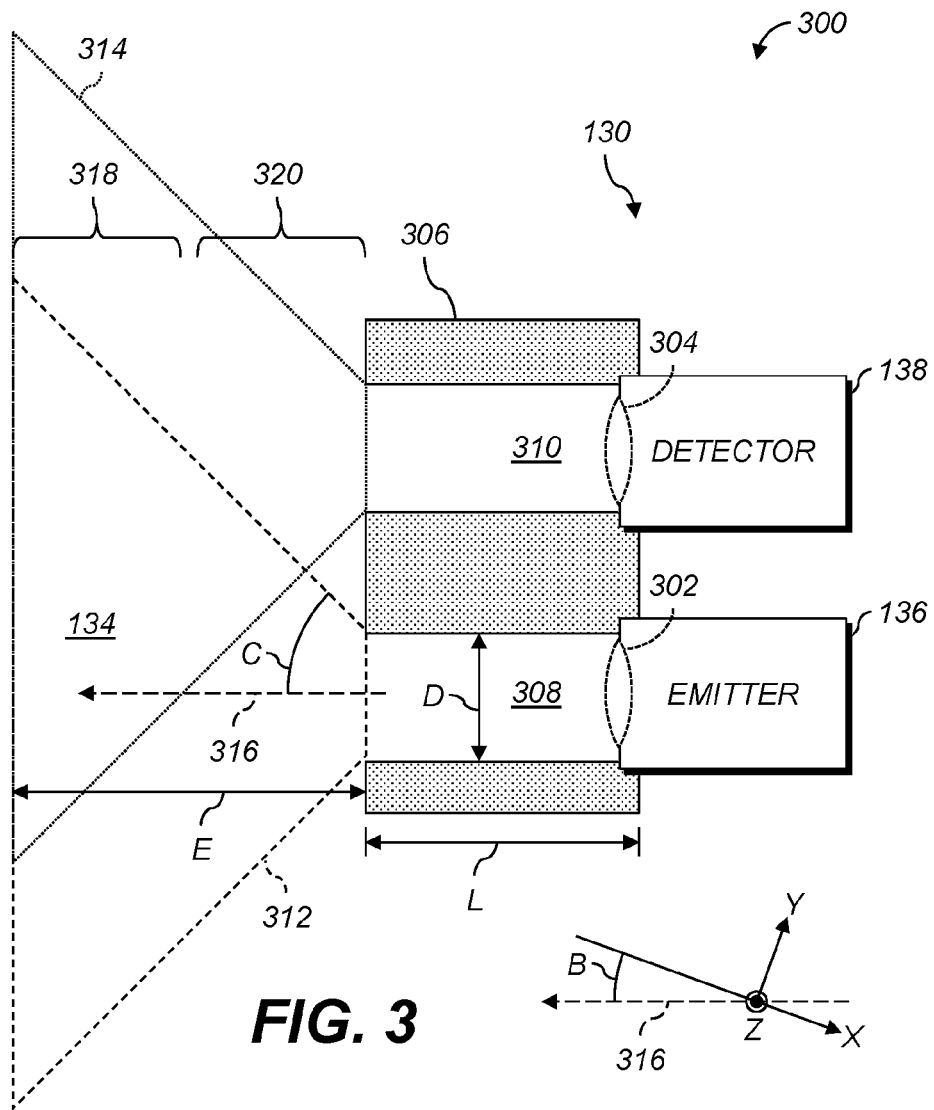
FIG. 3 is a schematic of optical components of an example accessory for a deterrent device.
Figure 7:
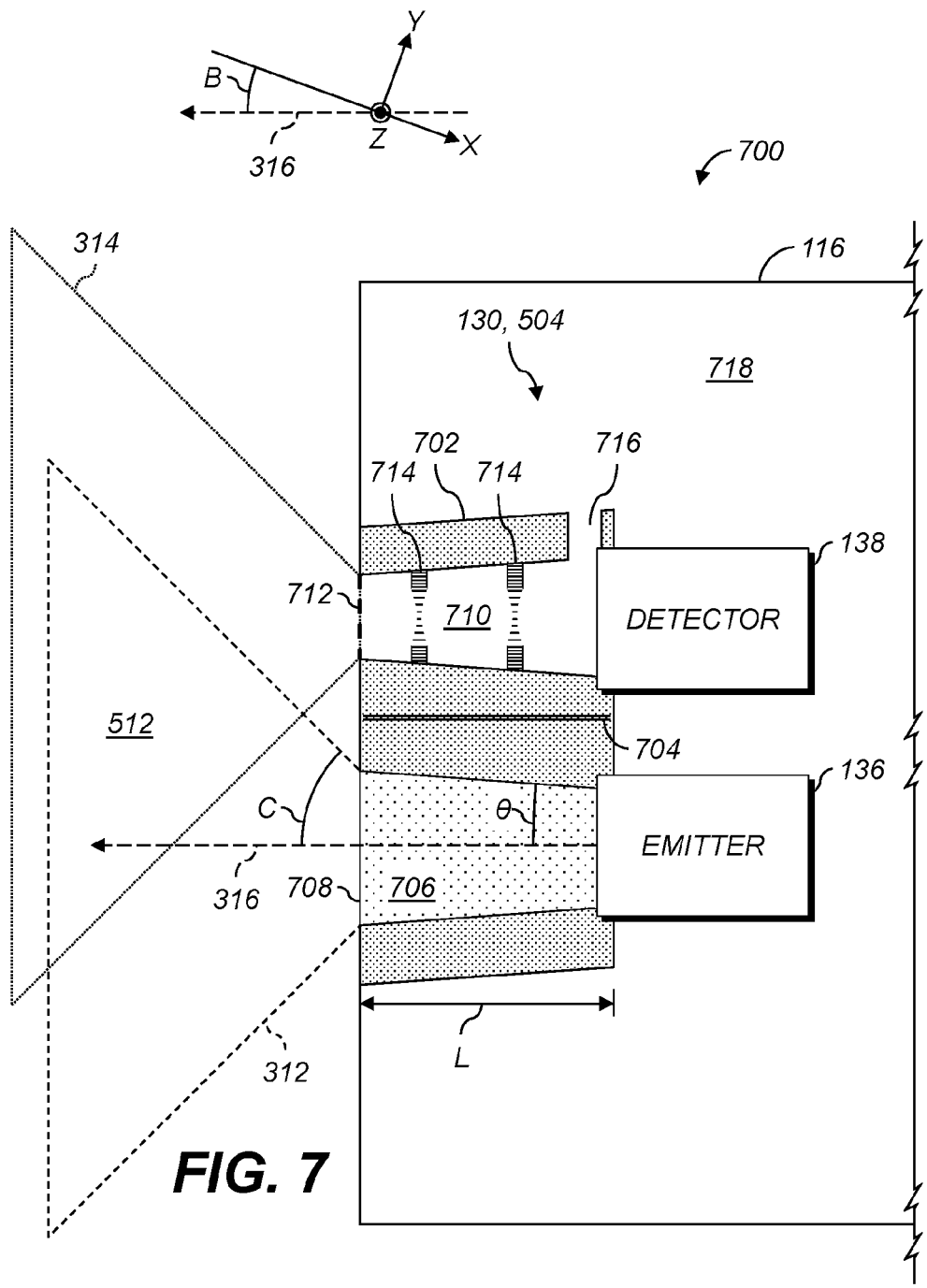
FIG. 7 is a schematic of optical components, including a light pipe and optical stops, of an example accessory for a deterrent device.

FIG. 3 shows an example optical configuration 300 of activation sensor 130. In FIGS. 3 and 7, illustrative light cones are shown for clarity of explanation. The specific illustrated shapes are not necessarily to scale, and are not limiting. In the example of FIG. 3, activation sensor 130 is oriented downward 20° from the horizontal, as noted by the axis labels. In some examples, emitter 136 includes or is coupled with lens 302. In some examples, detector 138 includes or is coupled with lens 304. In some examples (omitted for brevity), one or more lenses 302, 304 are positioned at the −X ends of bores 308, 310 rather than (as shown) at the +X ends. In some examples, at least one bore 308, 310 includes lenses at both ends.

Shroud 306 extends at least partly from emitter 136 and detector 138 toward sensing space 134. Shroud 306 has <100% transmissivity (% T) (e.g., is substantially opaque, or has <50% T) at the wavelength(s) emitted by emitter 136 or detected by detector 138. Therefore, the geometry of shroud 306 affects the geometry of sensing space 134. Shroud 306 includes an emitter bore 308 and a detector bore 310. Light from emitter 136 travels through emitter bore 308 and then into or towards sensing space 134. Light reflected from an object 204 in sensing space 134 travels through detector bore 310 to detector 138. In some examples, at least a portion of shroud 306 substantially prevents light emitted by emitter 136 from reaching detector 138 without first passing through at least a portion of sensing space 134.

In some examples, emitter bore 308 and detector bore 310 have the same length; in other examples, they have different lengths. Similarly, bores 308, 310 can have the same diameter (as illustrated) or different diameters; or the same cross-sectional shapes, or different cross-sectional shapes. Each bore 308, 310 can have a substantially constant cross-section along its length, or a varying cross-section. In this example, each bore 308, 310 is substantially cylindrical (substantially circular cross-section) with length L and diameter D. In the illustrated example, the bores 308, 310 are substantially parallel and extend normal to the active surfaces of emitter 136 and detector 138, respectively; in other examples, at least one bore 308, 310 does not so extend, or the bores 308, 310 are not substantially parallel. In some examples, a single bore 308 or 310 is wide enough that both light from emitter 136 and light to detector 138 pass through that single bore 308 or 310.

The distribution of light emitted by emitter 136 is represented by emitter cone 312. In some examples, any object within emitter cone 312 is illuminated by light from emitter 136. Similarly, the area from which light can be collected by detector 138 is represented by detector cone 314. In this example, sensing space 134 is the overlapping area between emitter cone 312 and detector cone 314, although this is not limiting. In some examples, emitter cone 312, detector cone 314, or sensing space 134 are limited in extent rearward (to the left of the figure) by inverse-square dropoff in optical flux with distance.

In the illustrated example, emitter cone 312 is characterized by optical axis 316 and angle C between optical axis 316 and the edge of emitter cone 312. In some examples, increasing L reduces C, and vice versa. Experiments were performed to determine the rearward extent E of sensing space 134 with D=1/32" for various values of L and various types of object 204 having different reflectivities. The results are in Table 1. In an example, L=0.15", giving C=10° and extents E between 1.02" and 2.30", depending on the type of object 204.

TABLE 1

| L | Measured C | Object | Measured E |
|---|---|---|---|
| .25" | (could not be measured) | One finger (Caucasian) | .20 |
| | | Two fingers (Caucasian) | .32 |
| | | Palm (Caucasian) | .52 |
| | | White card | 1.60 |
| .20" | 3° | One finger | .50 |
| | | Two fingers | .61 |
| | | Palm | 1.00 |
| | | White card | 1.90 |
| .15" | 10° | One finger | 1.02 |
| | | Two fingers | 1.26 |
| | | Palm | 1.54 |
| | | White card | 2.30 |
| .10" | 16.5° | One finger | 2.75 |
| | | Two fingers | 3.50 |
| | | Palm | 5.00 |
| | | White card | 6.50 |
| .06" | 22° | One finger | 3.49 |
| | | Two fingers | 4.86 |
| | | Palm | 5.54 |
| | | White card | 7.80 |
| 0" | 61° | One finger | 1.66 |
| | | Two fingers | 2.27 |
| | | Palm | 3.10 |
| | | White card | 4.00 |

In this example, a single shroud 306 is used for both emitter bore 308 and detector bore 310. In other examples, two shrouds are used, one having emitter bore 308 and the other having detector bore 310. In some examples, emitter bore 308 and detector bore 310 are open to the air; in other examples, they are filled with a material that is substantially clear (e.g., >50% T) at the wavelength(s) emitted by emitter 136 or detected by detector 138. In some examples, shroud(s) 306 is/are part of activation sensor 130; in other examples, shroud(s) 306 are separate from, but operably mounted to or adjacent, activation sensor 130. In some examples, shroud(s) 306 abut or are mounted to emitter 136 and detector 138 so that there is substantially no air gap between emitter 136 and emitter bore 308, and likewise for detector 138 and detector bore 310.

In some examples, sensing space 134 includes a first portion 318 and a second portion 320. In some embodiments of this type, sensed values from detector 138 or activation sensor 130 within a first range may be associated with the first portion 318, while sensed values within a second range may be associated with the second portion 320. Controller 128 can operate activatable system 122 at least partly in response to values indicating that a part (e.g., object 204) of a hand that grips the deterrent device 102 is in portion 318 or 320. Sensing space 134 may also include a buffer portion between the first portion 318 and the second portion 320. For example, controller 128 can use the distinction between first portion 318 and second portion 320 to provide hysteresis in activation/deactivation of activatable system 122.

In some examples, when object 204 is detected in first portion 318, the activation sensor 130 can wake from a deep-sleep mode. This can include, e.g., increasing the frequency of attempts to detect object 204. Activation sensor 130 can then activate the activatable system 122 once object 204 reaches second portion 320. This can reduce the latency in activating the activatable system 122 from deep sleep, compared to techniques using only a single portion of sensing space 134. In some examples, the roles of first portion 318 and second portion 320 can be reversed compared to those discussed in this paragraph.

The illustrated activation sensor 130 is mounted in housing 116 so that optical axis 316 forms an angle B with the –X axis, e.g., B≈20°, or 20°-22°. In some examples, grip activation system 132 can be designed for a specific model of deterrent device 102 based on measurements or drawings of the trigger guard 110 or other components of that model. For example, emission intensity of IR light from emitter 136, sensitivity of detector 138, angle C, bore length(s) L, bore diameter(s) D, or inclination angle B can be configured so that, when housing 116 is joined to deterrent device 102, distance E (or the projection of distance E onto the X axis) is shorter than distance T (FIG. 1), or is shorter than a distance from a rear surface of housing 116 to grip 112.

Figure 4:
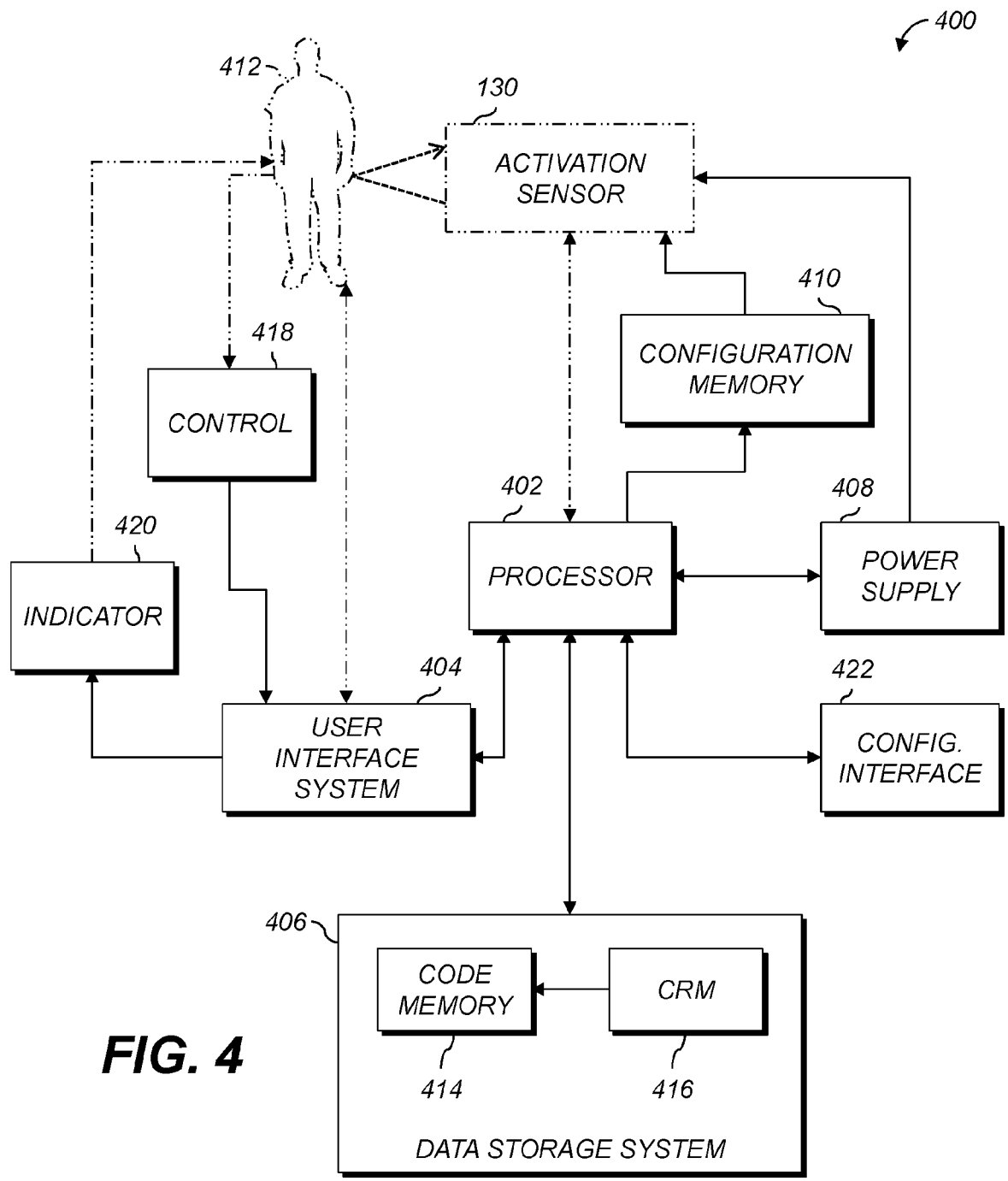
FIG. 4 is a schematic of an example control system, e.g., a controller for an accessory such as that shown in FIG. 1, and related components.

FIG. 4 is a high-level diagram showing the components of an example control system 400 (which can represent controller 128) for an accessory such as accessory 100, FIG. 1, and related components. The system 400 includes a processor 402 (which can represent controller 128), e.g., an ATtiny816 by MICROCHIP. System 400 can include a user interface system 404, a data storage system 406, and a power supply 408. In the illustrated example, system 400 is communicatively connected with activation sensor 130 (shown in phantom). In other examples, system 400 includes activation sensor 130. In some examples, activation sensor 130 can itself include a processor 402, a data storage system 406, or other components described herein with reference to control system 400.

In some examples, power supply 408 can include one or more batteries, e.g., primary or secondary batteries; fuel cells; other forms of portable energy storage and supply; or conductive components (e.g., a USB Micro-B or USB C receptacle) to receive power from rail 114 or an external power supply. Power supply 408 can include any circuits or systems and interconnections necessary to provide power to operate other components of system 400 or of activatable system 122. For example, power supply 408 can include power conditioning circuits, boost circuits, step-up circuits, or step-down circuits.

The activation sensor 130, the user interface system 404, and the data storage system 406 are communicatively connected to the processor 402. The phrase "communicatively connected" includes any type of connection, wired or wireless, for communicating data between devices or processors. For example, processor 402 can communicate with activation sensor 130 via 12C or another low-power bus technology. These devices or processors can be located in physical proximity or not. For example, subsystems such as activation sensor 130, user interface system 404, and data storage system 406 are shown separately from the processor 402 but can be stored completely or partially within, or integrated completely or partially with, the processor 402.

In the illustrated example, system 400 also includes configuration memory 410. Configuration memory 410 can store parameters controlling the operation of activation sensor 130. For example, configuration memory 410 can be or include a Flash or EEPROM holding the frequency (Hz) to be used for measurement sequences, e.g., detection attempts or other measurement sequences conducted by activation sensor 130. In other examples, configuration memory 410 is part of activation sensor 130.

In some examples, activation sensor 130 provides sensor data to processor 402. Sensor data can include analog or digital values, e.g., voltages or currents on analog readout lines; digital pulses carrying pulse-width modulated (PWM), pulse-amplitude modulated (PAM), or pulse-density modulated (PDM) data; or multi-bit pulse code modulated (PCM) signals, e.g., transmitted in serial or parallel. Digital sensor data can have a depth of, e.g., 4, 8, 12, 16, 24, or 32 bits, or another bit depth. Some examples of sensor data are discussed below.

Processor 402 can implement processes of various aspects described herein. Processor 402 and related components can, e.g., carry out processes for activating an activatable system 122 of accessory 100, as described herein. Steps of various methods described herein can be performed in any order except when otherwise specified, or when data from an earlier step is used in a later step. Example method(s) described herein are not limited to being carried out by components particularly identified in discussions of those methods.

Processor 402, and other processing devices described herein, can each include one or more central processing units (CPUs), microcontrollers (MCUs), microprocessors, field-programmable gate arrays (FPGAs), application-specific integrated circuits (ASICs), programmable logic devices (PLDs), programmable logic arrays (PLAs), programmable array logic devices (PALs), or digital signal processors (DSPs). Processor 402 can additionally or alternatively include one or more programmable analog devices. Processor 402 can include a microcontroller and other components, such as memory and ports, as are necessary to execute control logic for accessory 100 or grip activation system 132. Controller 128 may additionally or alternatively execute control logic expressed in the form of hard-wired electronics.

The user interface system 404 can convey information in either direction, or in both directions, between a user 412 and the processor 402 or other components of system 400. The user interface system 404 can include, e.g., pushbutton(s), switch(es), or any other device or combination of devices from which data is input to the processor 402 or by which power to processor 402 is controlled. The user interface system 404 also can include indicator LED(s), LCD display(s), or any other device or combination of devices to which data is output by the processor 402.

Data storage system 406 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 402 can transfer data (using appropriate components of activation sensor 130), whether volatile or nonvolatile; removable or fixed; electronic, magnetic, optical, chemical, mechanical, or otherwise. Example processor-accessible memories include but are not limited to: registers, floppy disks, hard disks, solid-state drives (SSDs), tapes, bar codes, Compact Discs, DVDs, read-only memories (ROM), erasable programmable read-only memories (EPROM, EEPROM, or Flash), and random-access memories (RAMs). One of the processor-accessible memories in the data storage system 406 can be a tangible non-transitory computer-readable storage medium, i.e., a non-transitory device or article of manufacture that participates in storing instructions that can be provided to processor 402 for execution.

In an example, data storage system 406 includes code memory 414, e.g., a RAM, and CRM 416, e.g., a tangible, non-transitory computer-readable rotational or solid-state storage device or medium such as a hard drive, Flash drive, dedicated Flash memory, PROM, EPROM, or EEPROM. Computer program instructions are read into code memory 414 from CRM 416. Processor 402 then executes one or more sequences of the computer program instructions loaded into code memory 414, as a result performing process steps or other operations described herein. In this way, processor 402 carries out a computer implemented process. Moreover, the computer program instructions, when loaded into processor 402 (or another processor), cause functions, acts, or operational steps of various aspects herein to be performed by processor 402 (or that other processor). For example, steps of methods described herein, and combinations of those, can be implemented by computer program instructions. Code memory 414 can also store data, or can store only code. In some examples, configuration memory 410 can be part of CRM 416 or data storage system 406. Additionally or alternatively, configuration memory 410 can be integrated into activation sensor 130.

In some examples, processor(s) 402 and, if required, data storage system 406 or portions thereof, are referred to for brevity herein as a "control unit." For example, a control unit can include a CPU or DSP and a computer storage medium or other tangible, non-transitory computer-readable medium (e.g., CRM 416) storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. A control unit of the latter type may not require or include a data storage system 406, but may still perform functions described herein. In some examples of control units including ASICs or other devices physically configured to perform operations described herein, a control unit does not include computer-readable media storing executable instructions. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

For brevity, discussions of functions performed "by" module(s) or instruction(s) (or similar terms) refer, in the context of processor-executable instructions, to functions performed in response to processor-executable instructions of the referred-to module(s) or instruction(s). In the context of FPGAs or other control units not using processor-executable instructions, discussions of functions performed "by" module(s) refer to functions performed by the special-purpose logic or other configuration of those module(s), or by special-purpose logic implementing function(s) of those instruction(s).

Illustrative Operations

With continued reference to FIGS. 1-4, various examples permit detecting object 204 in sensing space 134. Various examples do so while maintaining battery life, so that accessory 100 will be immediately usable a long time (from the user's perspective) after the last use of accessory 100, e.g., after deterrent device 102 has been in storage for at least N months, $1 \leq N \leq 12$. Various examples retain at least 50% of battery capacity after four months in sleep, or at least 50% of battery capacity after six months. Various examples provide a deep-sleep mode in which measurement sequences are conducted at 1.5 Hz, e.g., about 1 Hz. Some examples enter deep-sleep or another lower-power mode after, e.g., a period of five minutes (or another predetermined amount of time) has passed without detection of an object in sensing space 134. Various examples include the ability to turn off accessory 100 to save battery. During an off period, measurement sequences are not performed, in some examples.

Various examples include methods for actuating an accessory 100 for use with a deterrent device 102. Deterrent device 102 has a grip 112, a trigger guard 110, and a rail 114 forward of the trigger guard 110 (with respect to the grip 112). In one aspect of such a method, an object is detected via reflection of electromagnetic radiation using an activation sensor 130. Some examples include detecting an object positioned at least part of (e.g., at least one-half of) a length of the trigger guard away from an activation sensor 130 in the accessory. For example, with respect to distance T (FIG. 1), example methods can include detecting an object that is farther from the rear of accessory 100 than a distance $\alpha T$, $\alpha \in [0.1, 0.7]$ (e.g., $\alpha = 0.5$). A grip activation system 132 that includes the activation sensor 130 determines a control output for an activatable system 122 (e.g., an electronic system) in the accessory 100.

Various examples include shroud(s) 306 sized and shaped to reduce the optical power required to be emitted by emitter 136 to reliably detect objects of a predetermined size or shape range in sensing space 134 (the corresponding optical power level can be determined experimentally for a particular configuration of accessory 100 and deterrent device 102 tested with particular shapes of object). Shrouding the detector 138 can also reduce measurement noise by reducing the amount of stray light reaching the detector 138.

Various examples transmit a pulse from emitter 136 and measure reflected energy using detector 138, and then deactivate emitter 136 until the next pulse time. Various examples transmit successive pulses at an active pulse rate and sum, average, or otherwise combine the resulting readings to determine the amount of reflected light. For example, a measurement sequence can include n pulses, $0 \leq n \leq 255$, at a $(16 \ \mu s)^{-1}$ pulse rate and a ~45% emitter duty cycle. Therefore, a measurement sequence can last, e.g., <5 ms.

Various examples include adjusting the number of pulses in a measurement sequence as a function of the measured values, or terminating a measurement sequence if a predetermined reflected power is measured. For example, if the first (or $n^{th}$, e.g., $1 < n < 16$) pulse receives sufficient reflected power to indicate presence of an object, the measurement sequence can be terminated early to avoid using energy that would otherwise be spent emitting pulses.

Various examples trigger measurement sequences (detection attempts) at a measurement rate, e.g., 2 Hz (e.g., stored in configuration memory 410). In some examples, processor 402 reduces or removes power to activation sensor 130 (or component(s) thereof, e.g., emitter 136 or detector 138) during the time between measurement sequences. For example, a 5 ms sequence triggered once every 500 ms can reduce power drain by 99% compared to continuously triggering such sequences. In some examples, the measurement rate and battery type are selected to provide a battery life of at least one year. For example, processor 402 can direct power supply 408 to deactivate a voltage supply to activation sensor 130. Additionally or alternatively, processor 402 can cause opening of a relay, MOSFET, or other switch (e.g., mechanical or solid-state) connecting a voltage supply to activation sensor 130. Additionally or alternatively, processor 402 can transmit a command to activation sensor 130 (or portion(s) thereof, e.g., emitter 136 or an internal processor) to cause activation sensor 130 to transition to a low-power mode.

In some examples, in a low-rate mode, processor 402 can trigger measurement sequences at about 2 Hz. In some examples, in a high-rate mode, processor 402 can trigger measurement sequences at about 50-70 Hz, e.g., about 60 Hz. In some examples, each measurement sequence can include 20-40 pulses, e.g., 30 pulses, of electromagnetic radiation.

In some examples, as noted above, sensing space 134 is outside, or extends beyond, volume 120 defined by trigger guard 110 (or a corresponding volume near a trigger 108, for deterrent devices 102 without a trigger guard 110). In some examples, sensing space 134 is configured so that the user's finger will pass through sensing space 134 before reaching volume 120 as the user grips the deterrent device 102 to operate it. In some examples, this can permit activating the activatable system 122 of accessory 100 before the deterrent device 102 is operated. This can also permit activating the activatable system 122 of accessory 100 when the user grips deterrent device 102 in a non-firing position, e.g., with the trigger finger extending forward alongside trigger guard 110 rather than in trigger guard 110.

Some examples provide detection before the user's hand is positioned to fire the deterrent device 102, and continue to detect the presence of the user's hand when it is in position to fire the deterrent device 102. This can permit reducing the measurement rate compared to some prior schemes, since the activatable system 122 can be activated beginning during the time before the user's hand is positioned to fire.

In some examples, controller 128 receives a reflected-light signal, presence signal, or other signal representing the measurement from detector 138. Controller 128 determines whether the signal is within a range of values that is associated with the presence of object 204 in sensing space 134. When the signal is within the range of values associated with object presence, controller 128 activates activatable system 122. In operation, controller 128 can, e.g., cause activation sensor 130 to sense, periodically, whether object 204 is still within sensing space 134, e.g., at a rate about between 0.5 Hz and 50 Hz. In embodiments, the sensing period can change dynamically, such as where a more frequent sampling is done during periods of activation.

In some examples, controller 128 can use a comparison function, comparing a currently read signal or an average of several currently read signals to immediate past signals or an average of many past signals. Controller 128 can determine when to activate or take other control actions based upon a relative change in reflected light from an initial state (based on the past signal(s)) to a second state (based on the currently-read signal(s)).

Additionally or alternatively, activation or control determinative functions or algorithms may be used to detect patterns of changes in capacitance that are indicative of activation or other control behavior. Machine-learning or other artificial-intelligence algorithms may also be applied by processor 402 to capacitive signals received by processor 402 to determine whether a finger or other object is present in sensing space 134.

In embodiments, processor 402 can be adapted to receive information for use in determining thresholds, functions or other data useful in making activation or other control decisions. For example, as noted above, storage conditions for different uses of a deterrent device may vary widely. Some deterrent devices may be stored indoors in gun safes or the like for long periods of time until needed, while other deterrent devices may be carried in external holsters and exposed to the elements. The optical characteristics sensed in each type of storage may be different. In some examples processor 402 stores data that helps to characterize storage conditions so that more accurate discrimination between a holstered or stored condition and a grasped or use condition can be made.

In some examples, control system can automatically trigger measurement sequences when deterrent device 102 and associated activatable system 122 are not in use, such as when deterrent device 102 is in storage, and can associate corresponding measurements with storage conditions. This association can be used to adjust comparison modes, thresholds, functions, algorithms, or other decision-making logic. Similarly, processor 402 can use measurements made during use of deterrent device 102 and associated activatable system 122, as well as measurements made during known transitions, to refine modes, thresholds, functions, algorithms or other decision making logic to particular circumstances. In this way, it becomes possible for processor 402 to better adapt predetermined algorithms so that more accurate activation and de-activation and other decisions regarding operation are made.

Some examples include multiple activation sensors 130 having respective, different sensing spaces 134. Each sensing space 134 can partly overlap with at least one other sensing space 134, or can be disjoint from all other sensing spaces 134.

In some examples, processor 402 can trigger a measurement sequence, e.g., by sending a command or other trigger signal via an I2C, SPI, 1-WIRE, or other control bus; or by asserting a logic level or edge on an electrical node. Processor 402 can then receive (e.g., from a TMD2772 or other IR detector 138) sensor data, e.g., a value or signal (e.g., a digital value) representing the energy collected by IR detector 138 during the measurement sequence. For example, processor 402 can perform an $I^2C$ read to retrieve the sensor data. Processor 402 can then activate activatable system 122 in response to the measured value or signal satisfying a predetermined activation criterion or criteria.

Throughout this document, any determination that a particular data item "satisfies" a query or criterion is equivalent to a determination that that data item fails to satisfy an inverse query or criterion. Accordingly, discussion of criteria herein specifically contemplates the use of inverted criteria with inverted senses of what satisfies a criterion.

In some examples, the criterion can be associated with a user-selected sensitivity level or other configuration parameter. For example, the parameter can specify high, medium, or low sensitivity, or a sensitivity level from a set of two, four, or greater than four levels. In some examples, criteria for the various sensitivity level(s) can be determined empirically. For example, one of the sensitivity levels can be set so that holding grip 112 with both hands will cause activation, but holding grip 112 with only one hand will not.

In some examples, after activating activatable system 122, processor 402 can periodically trigger measurement sequences and receive respective values or signals. Processor 402 can deactivate the activatable system 122 in response to one or more of the respective values or signals satisfying a predetermined deactivation criterion or criteria. The criterion or criteria can test one of the respective values or signals, or more than one. For example, a deactivation criterion can be satisfied if N consecutive values of the respective values or signals meet a predetermined deactivation-value criterion, for a predetermined N.

In some examples, a deactivation criterion is the negation of an activation criterion. For example, an activation criterion of V>200 can be associated with a deactivation criterion of V≤200, for a value V of the respective values or signals. Additionally or alternatively, the deactivation criterion can provide hysteresis with respect to a corresponding activation criterion, or can otherwise differ from a corresponding activation criterion. For example, an activation criterion of V>K can be associated with a deactivation criterion of V≤αK, 0<α<1. In some examples, α=0.75 or 0.5, or is substantially equal to 0.75 or 0.5. In some examples, criteria include: activation at V≥160 and deactivation at V≤120 (e.g., for low sensitivity); activation at V≥110 and deactivation at V≤82 (e.g., for medium sensitivity); or activation at V≥80 and deactivation at V≤60 (e.g., for high sensitivity).

In some examples, user interface system 404 includes or is connected with a control 418 operable by user 412 to select a sensitivity level or otherwise adjust configuration parameters used by processor 402 in determining when to activate activatable system 122. For example, control 418 can include one or more buttons that, when pressed, cycle through sensitivity levels, or increase/decrease sensitivity. Additionally or alternatively, control 418 can include a touch sensor or a knob.

In some examples, user interface system 404 includes or is connected with an indicator 420 configured to provide information to user 412 regarding the current sensitivity level or other parameters. In some examples, indicator 420 can include laser module 124, lamp 126, one or more LED(s), a display, or another optical indicator; an aural indicator such as a piezoelectric buzzer or a speaker; or a tactile/haptic indicator such as a vibration unit (e.g., including a motor driving an off-balance weight to cause vibration). In some examples, indicator 420 includes laser module 124, lamp 126, or another light emitter, and processor 402 is configured to blink indicator 420 a number of times correlated with the sensitivity level (e.g., 1 time for off, 2 times for low sensitivity, 3 times for medium sensitivity, and 4 times for high sensitivity, or vice versa).

In some examples, processor 402 is connected with a configuration interface 422. Configuration interface 422 can include, e.g., a USB receptacle and USB-peripheral electronics connected thereto; an antenna and a BLUETOOTH radio connected thereto; a touchscreen; a memory-card slot; or another subsystem for receiving configuration data. For example, configuration interface 422 can permit configuring the activation of activatable system 122 via a USB connection with an app running on a desktop computer, or via a BLUETOOTH connection with a smartphone app.

In some examples, system 400 does not include a control 418. In some examples, system 400 does not include an indicator 420. In some examples, system 400 does not include a configuration interface 422. In some examples, system 400 includes at most one of a control 418, an indicator 420, and a configuration interface 422. In some examples, system 400 includes at most two of a control 418, an indicator 420, and a configuration interface 422. In some examples, system 400 includes neither a control 418, nor an indicator 420, nor a configuration interface 422.

Figure 5:
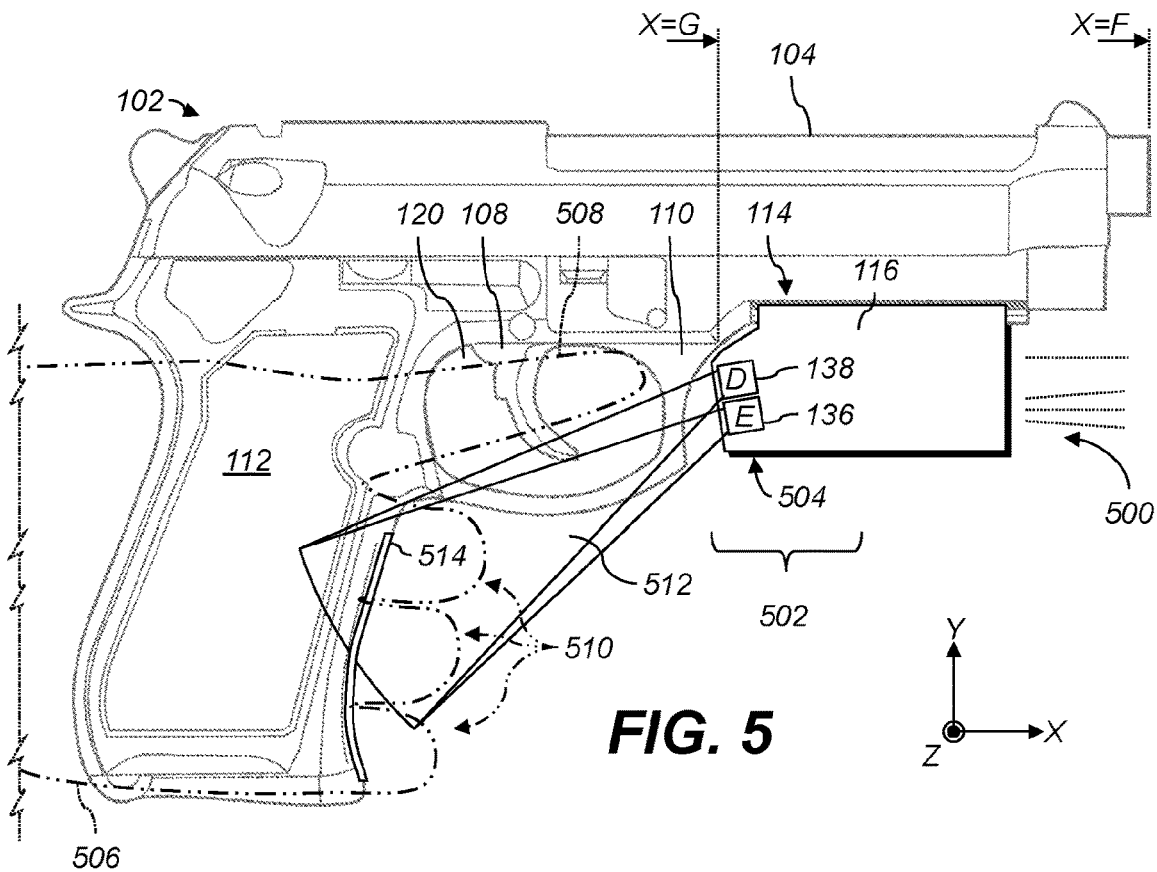
FIG. 5 is a side elevation of an accessory for a deterrent device. A deterrent device is also shown for ease of reference.

FIG. 5 is a side elevation of an accessory 500 for a deterrent device 102, illustrated as a firearm. Components are as in FIG. 1 except as noted here. For brevity, some components are omitted or unlabeled, as compared to FIG. 1. Housing 116 of accessory 500 is mounted to rail 114 of deterrent device 102 ahead of trigger guard 110. Trigger guard 110 encloses trigger 108 and volume 120, and is ahead of grip 112. Accessory 500 includes grip activation system 502 having activation sensor 504 (which can represent activation sensor 130) that includes emitter 136 and detector 138. The illustrated maximum extent of deterrent device 102 along the X axis is X-coordinate F, in this example at the end of barrel 104. The illustrated maximum extent of trigger guard 110 along the X axis is X-coordinate G.

Also shown in phantom is hand 506 of a user of deterrent device 102. In the illustrated example, hand 506 is arranged so that the trigger finger 508 thereof is off of trigger 108, and extending alongside deterrent device 102. Non-trigger fingers 510 of hand 506 are shown below trigger guard 110 and ahead of (e.g., holding) grip 112. Some prior schemes do not detect non-trigger fingers 510.

Sensing space 512 is oriented more steeply downward than sensing space 134, FIG. 1 (e.g., angle B, FIG. 3, has a larger magnitude with respect to sensing space 512 than with respect to sensing space 134). As shown, sensing space 134 can detect at least one of the non-trigger fingers 510. This can permit activating activatable system 122 when the user picks up deterrent device 102, e.g., before the user is ready to fire or otherwise operate deterrent device 102.

In some examples not shown, the sensing space of grip activation system 502 includes at least a portion of sensing space 134 and at least a portion of sensing space 512, e.g., substantially the union of sensing space 134 and sensing space 512. For example, length L can be reduced to increase angle C to the extent necessary to capture the desired sensing space, and angle B can be adjusted to align the optical axis of activation sensor 504 to captured the desired sensing space.

FIG. 5 also shows contrast element 514. Contrast element 514 can provide increased optical contrast between presence and absence of object 204, e.g., hand 506, compared to grip 112. The improved optical contrast can be contrast at wavelength(s) emitted by emitter 136 or detected by detector 138. In some examples, contrast element 514 includes a retroreflector, so that detector 138 detects a relatively higher amount of light when object 204 is absent, and a relatively lower amount of light when object 204 is present and obscuring portion(s) of the retroreflector. In some examples, contrast element 514 includes an absorber (e.g., a carbon-containing material such as a nanotube absorber, or a high-absorbance cloth such as duvetyne), so that detector 138 detects a relatively lower amount of light when object 204 is absent, and a relatively higher amount of light when object 204 is present and reflecting light from emitter 136. In some examples, a holster can include a contrast element 514 to permit detecting when deterrent device 102 is holstered.

The illustrated sensing space 512 is positioned proximate to grip 112 of deterrent device 102, and is sized so that at least one finger (e.g., non-trigger finger 510) of hand 506 of a user gripping grip 112 of deterrent device 102 will be positioned within sensing space 512. When deterrent device 102 is gripped by hand 506 of a user, trigger finger 508 is positioned adjacent the trigger guard 110 and at least one non-trigger finger 510 wraps around grip 112 and under trigger guard 110, bringing at least one non-trigger finger 510 into sensing space 512. Sensing space 512 can defined to detect a non-trigger finger 510 passing under trigger guard 110 either from the left or the right side of deterrent device 102.

In some examples, sensing space 512 can extend at least partly adjacent to grip 112 of deterrent device 102. In some examples, sensing space 512 includes or consists of at least one point having an X-coordinate $P_X<G$, and from which point a test ray does not strike any portion of deterrent device 102, the test ray having either (1) $X>0$ and $Y \leq 0$ or (2) $X=0$ and $Y<0$. Other example sensing spaces 512 include or consist of point(s) with $P_X<G$, and from which point a test ray does not strike any portion of deterrent device 102, the test ray having $X>0$ and $Y<0$.

The shape and size of sensing space 512 (or sensing space 134) can be defined in various ways. For example, the length, width, and depth of sensing space 134, 512 can be determined in part based upon an intensity of the light from emitter 136.

FIG. 6 shows a front elevation 600 of the example of FIG. 5. Accessory 500 is mounted to rail 114 of deterrent device 102. Components are as in FIGS. 1, 2, and 5 except as noted here. For brevity, some components are omitted or unlabeled, as compared to FIG. 2.

Activation sensor 504 detects rearward of housing 116, past the plane of the figure, as indicated by the "0" mark. Sensing space 512 extends backwards along the right side of deterrent device 102 (as shown in FIG. 5) in order to detect object 602, e.g., a non-trigger finger 510 of hand 506, or a glove over such a finger. In the depicted example, sensing space 512 is not confined within half-space 206 defined by the right edge of trigger guard 110. In other examples, sensing space 512 is confined within half-space 206. As noted above with respect to sensing space 134, FIGS. 1 and 2, activation sensor 504 or sensing space 512 can be additionally or alternatively arranged on the left side of deterrent device 102.

FIG. 7 shows an example optical configuration 700 of activation sensor 130 (or activation sensor 504, and likewise throughout). Components are as in FIGS. 1-3 and 5-6 except as noted here. For brevity, some components are omitted (e.g., lenses) or unlabeled, as compared to FIG. 3. Shroud 702 extends at least partly from emitter 136 and detector 138 toward sensing space 512. Shroud 702 can have properties such as those described herein with reference to shroud 306. In some examples, shroud 702 is sufficiently opaque at the wavelength emitted by emitter 136 to prevent substantially all light from emitter 136 that passes through shroud 702 to detector 138 has an effect on the output of detector 138 that is within a measurement-noise level of the detector 138. In some examples, shroud 702 can include a body having a first transmittance at the wavelength(s) emitted by emitter 136, and a metal layer or film, or other blocking structure 704 having a second, lower transmittance at those wavelength(s). The blocking structure 704 can be arranged in shroud 702 between emitter 136 and detector 138, e.g., substantially parallel to optical axis 316, in some examples.

Light pipe 706 is located within (e.g., substantially fills) an emitter bore of shroud 702, in the illustrated example. Light pipe 706 can include glass, acrylic, or another material that is more transparent at wavelength(s) emitted by emitter 136 than is shroud 702. In some examples, the material of light pipe 706 can be selected based on refractive index so that at least a predetermined percentage of the light from emitter 136 undergoes total internal refraction at the interface between shroud 702 and light pipe 706. In some examples, the angle of expansion θ of light pipe 706 with respect to optical axis 316 can be adjusted to modify angle C. For example, increasing θ can decrease C, e.g., as C=θ/2. Decreasing C can focus the light from emitter 136 and thereby increase the power efficiency of activation sensor 130. In some examples, C=12.5°.

In some examples, surface 708 at the output end of light pipe 706 can include or be coated with an antireflective (AR) layer, index-matching layer, diffuser, or other optical structure to couple light traveling through light pipe 706 out into sensing space 512 (or sensing space 134, and likewise throughout). In the illustrated example, light pipe 706 is wider at the output end than at the input end, i.e., is narrower closer to emitter 136. For example, light pipe 706 can have a truncated-conical shape. In some examples, light pipe 706 is omitted, and an emitter bore 308 having such a shape (or other shape narrower closer to emitter 136) is used.

At least some light reflected from objects 204, 602 in sensing space 512 can reach detector bore 710. In some examples, an input end of detector bore 710 is capped by a cover 712 (represented graphically by a heavy dashed line), e.g., glass or plastic. Cover 712 can, e.g., reduce dust incursion into detector bore 710. Cover 712 can include or be coated with an anti-scratch (mechanical protection) layer, an AR layer, index-matching layer, diffuser, or other optical structure to permit more light to pass through cover 712 into detector bore 710 than would be the case without such a structure. Additionally or alternatively, cover 712 can include, be coated, or be coupled to (e.g., using optically clear adhesive) an optical filter layer (or material) that filters out predetermined wavelengths, e.g., ambient light or wavelengths other than those emitted by emitter 136. An optical filter can increase the SNR of the detection system.

In some examples, detector bore 710 is narrower at the input end than at the output end, i.e., is wider closer to detector 138. For example, detector bore 710 can have a truncated-conical shape. In other examples, detector bore 710 (or light pipe 706 in the emitter bore) can be shaped substantially as a frustum, e.g., a conical frustum or a square frustum, In still other examples, detector bore 710 has substantially constant diameter along its length (except as noted in the next paragraph).

In the illustrated example, stops 714 (e.g., aperture stops, field stops, or other optical stops) protrude into detector bore 710. Stops 714 can reduce the amount of off-axis light reaching detector 138 (e.g., reduce the field of view of detector 138), and thereby increase the signal-to-noise ratio (SNR) of measurements by activation sensor 130. In some examples, one or more stops 714 can be used with detector bores 710 having different shapes, e.g., a detector bore 710 having a substantially constant diameter along its length (except for the stops 714). FIG. 7 shows two coaxial annular stops arranged along the length of detector bore 710. Additionally or alternatively, a stop 714 can have a rectangular, triangular, wedge (e.g., shutter-leaf), or other shape. A stop 714 can be rotationally symmetric about the optical axis of detector bore 710, or not. Any number of stops 714 can be present in detector bore 710.

In some examples, shroud 702 defines at least one opening 716 between detector bore 710 and an environment 718 outside shroud 702. Environment 718 can be, e.g., air or vacuum inside an interior volume of housing 116. Opening 716 can permit off-axis light that passes stops 714 to exit detector bore 710 and be absorbed within environment 718 or other portions of, or components within, housing 116, rather than striking detector 138. This can further reduce the amount of off-axis light reaching detector 138 and thereby increase the SNR of activation sensor 130. Some examples increase SNR of measurements by detector 138 using at least one of the following techniques: a shroud 306 having an emitter bore 308 or a detector bore 310; a light pipe 706; stops 714 in a detector bore 710; opening 716; or ambient-light rejection as discussed herein with reference to FIG. 1.

Figure 8:
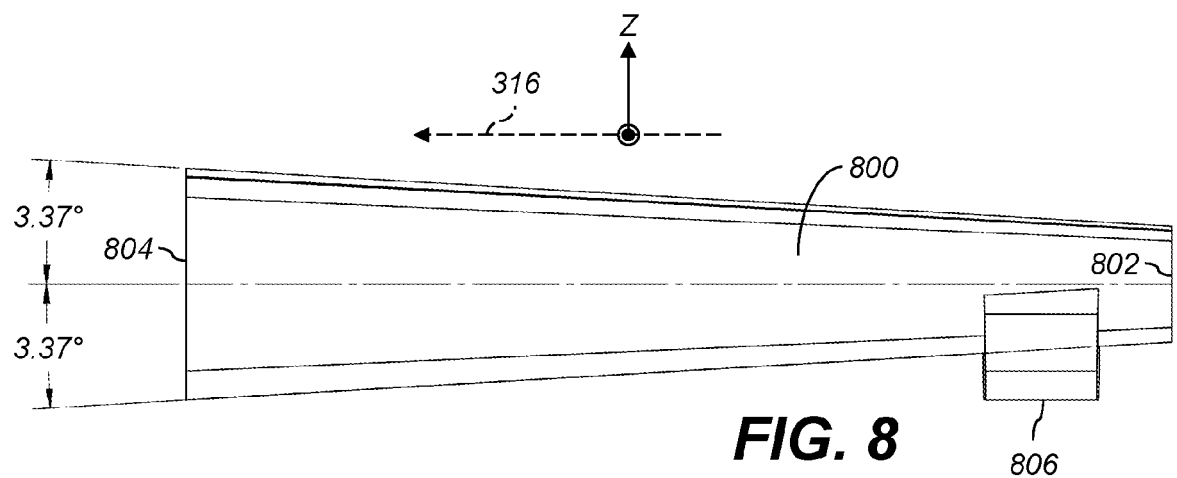
FIG. 8 is a side view of a light pipe according to various examples.

FIG. 8 is a side view of a light pipe 800 (which can represent light pipe 706). In some examples, end 802 is a square 0.04" on a side, with rounded corners having a 0.005" radius. In some examples, end 804 is a square 0.08" on a side, with rounded corners having a 0.01" radius. In some examples, each end of light pipe 800 has a surface roughness of 15 μ-in. or less. In some examples, light pipe 800 comprises polycarbonate (e.g., 94-V0), glass, or other materials described herein with reference to FIG. 7. In some examples, the Z axis points in the opposite direction from that illustrated. Using a light pipe such as light pipe 800 can shape light beams passing through the light pipe 800 and reduce or eliminate the need for lenses, in some examples. Example light-pipe materials are described herein with reference to light pipe 706.

In some examples, light pipe 800 includes retention feature 806. Retention feature 806 can be added after fabrication, or molded in. In some examples, surfaces of retention feature 806 can have a Charmilles #22, #23, #24, #25, #26, or #27 finish.

Figure 9:
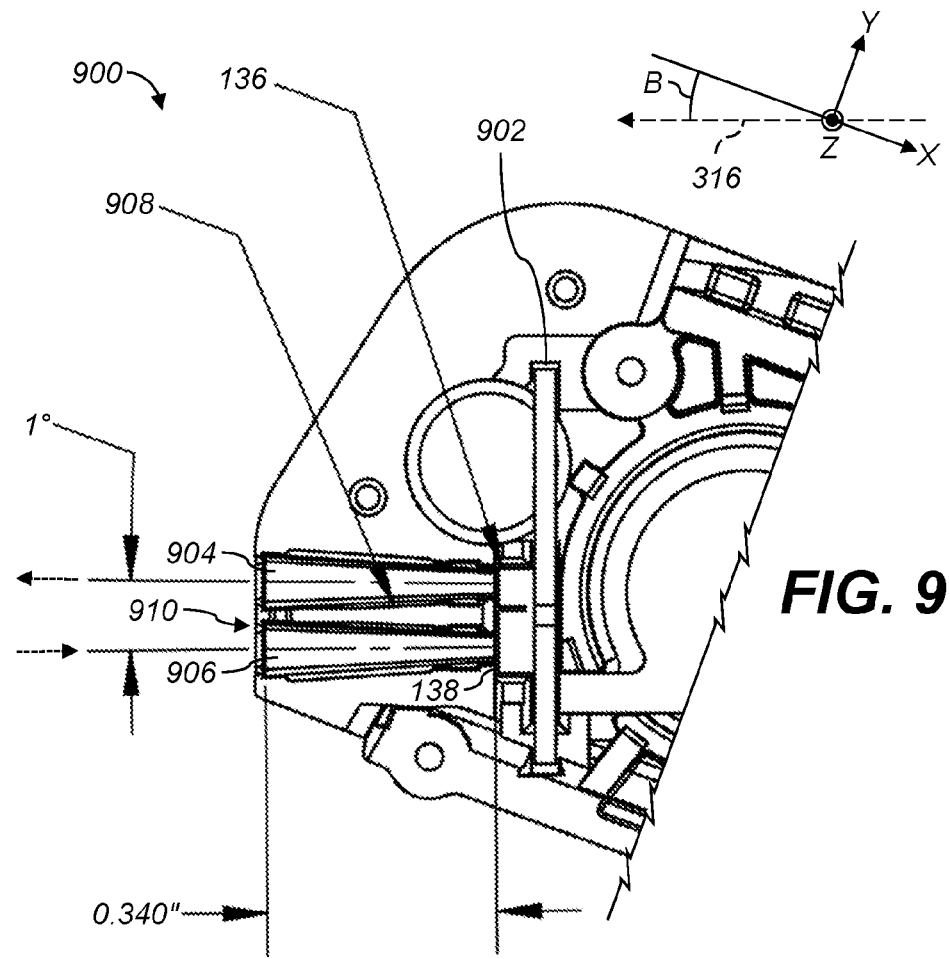
FIG. 9 shows an example optical configuration of a grip activation sensor, and a portion of an example housing.

FIG. 9 shows an example optical configuration 900 of activation sensor 130 (or activation sensor 504, and likewise throughout). FIG. 9 also shows a portion of an example housing 116. Components are as in FIGS. 1-3, 5-6, and 8 except as noted here. For brevity, some components are omitted (e.g., lenses) or unlabeled, as compared to FIG. 3.

Emitter 136 and detector 138 are mounted to circuit board 902. Light pipe 904 (which can represent light pipe 706, 800) is arranged to convey light from emitter 136. Light pipe 906 (which can represent light pipe 706, 800) is arranged to convey light to detector 138. In some examples, light pipes 904 and 906 have substantially identical designs. Light pipes 904, 906 can have longitudinal (optical) axes that are substantially parallel, or that are nonparallel. In the illustrated example, the longitudinal axes of light pipes 904, 906 are coplanar (in the XY plane) and have point in respective directions that differ by 1° of rotation around the Z axis.

Isolation barrier 908 (which can represent blocking structure 704) is arranged between light pipe 904 and light pipe 906. Isolation barrier 908 restricts or prevents emitted light from reaching detector 138 without first having passed through light pipes 904 and 906. Housing 910 (which can represent housing 116) can include two openings, one adjacent to end 804 of the respective light pipe 904, 906. Each opening can be substantially a square, e.g., with square or rounded corners, 0.07" on a side.

Further Illustrative Operations and Configurations

FIG. 10 is a flowchart illustrating an example process 1000 for activating an activatable system 122. Process 1000 can be performed, e.g., by a control unit (e.g., controller 128 or processor 402) of grip activation system 132, e.g., in response to computer program instructions stored in data storage system 406.

For clarity of explanation throughout FIGS. 10-17, reference is herein made to various components shown in FIG. 1-9 that can carry out or participate in the steps of the example method. It should be noted, however, that other components can be used; that is, example method(s) shown in FIGS. 10-17 are not limited to being carried out by the identified components. Moreover, throughout FIGS. 10-17, the steps can be performed in any order except when otherwise specified, or when data from an earlier step is used in a later step. In some examples, any illustrated block can be followed, or can be directly followed, by any block illustrated as being subsequent to that block through one or more arrows, unless otherwise indicated (e.g., by data dependencies between blocks).

In some examples, process 1000 can be performed by a controller of grip activation system 132. Grip activation system 132 can be configured to detect presence of an object 204, 602 (e.g., hand 506, trigger finger 508, or non-trigger finger(s) 510) in a sensing space 134, 512, and can include an emitter 136 configured to emit first electromagnetic radiation having a first wavelength and a detector 138 configured to detect second electromagnetic radiation having the first wavelength. In some examples, the first wavelength is between 650 nm and 1 mm. In further examples, the first wavelength may be less than 650 nm. In still further examples, the first wavelength may be greater than 1 mm. For instance, in some examples, the first wavelength may be up to and/or including midwave and/or long wave infrared. In some examples, the first wavelength may include, but may not be limited to, visible light and/or ultraviolet light.

At 1002, the control unit can determine, based at least in part on the second electromagnetic radiation, that an object 204, 602 is present in the sensing space 134, 512. Examples are discussed herein, e.g., with reference to FIGS. 3-6, controller 128 of grip activation system 132, processor 402, and FIGS. 1, 2, and 7. For example, the control unit can test sensor data representing the second electromagnetic radiation against one or more predetermined criteria and determine that an object 204, 602 is present if the sensor data satisfies the one or more predetermined criteria.

At 1004, the control unit can provide an activation signal to an activatable system 122 in response to determining that the object 204, 602 is present in the sensing space 134, 512. Examples are discussed herein, e.g., with reference to controller 128, FIGS. 1 and 3, and processor 402, FIG. 4. For example, the control unit can provide a logic level or edge; set a time-varying digital output to a predetermined pulse width or pulse density; set an analog output to a predetermined current or voltage; or write a control value to a register, e.g., via SPI, I²C, or another bus.

In some examples, an electronic device (e.g., accessory 100) can include a grip activation system 132 configured to perform operations 1002 and 1004. The electronic device can also include a housing 116 supporting the grip activation system 132 and having a mounting portion 202. Mounting portion 202 can be joinable to a deterrent device 102 to position the grip activation system 132 so that the sensing space 134, 512 extends at least partly laterally adjacent to a trigger guard 110 of the deterrent device 102. Examples are discussed herein, e.g., with reference to FIGS. 1, 2, 5, and 6. Example housings 116 are described herein with reference to FIGS. 1-3, 5-7, and 9. In some examples, accessory 100 includes an activatable light source, e.g., laser module 124 or lamp 126.

In some examples, the electronic device comprises a first light pipe configured to direct light from the emitter 136 towards the sensing space 134, 512 and a second light pipe configured to direct light from the sensing space 134, 512 toward the detector 138. Example light pipes are described herein with reference to FIGS. 7 and 8.

In some examples, mounting portion 202 is joinable to deterrent device 102 to position grip activation system 132 so that sensing space 134, 512 is disjoint from a volume 120 defined by the trigger guard 110. Examples are discussed herein, e.g., with reference to at least FIGS. 2 and 5.

In some examples, mounting portion 202 is joinable to the deterrent device 102 to position the grip activation system 132 so that the sensing space 134, 512 is at least partly outside a volume 120 defined by the trigger guard 110. The control unit can detect an object 204, 602 moving through the sensing space 134, 512 towards the volume 120 defined by the trigger guard 110 before the object 204, 602 enters the volume 120 defined by the trigger guard 110. For example, by triggering measurement sequences as defined herein and testing the resulting data against activation or deactivation criteria, the control unit can determine whether or not an object 204, 602 is in sensing space 134, 512 without the need to measure volume 120.

In some examples, mounting portion 202 is joinable to deterrent device 102 to position grip activation system 132 so that a rearward extent E of the sensing space 134, 512 is shorter than a distance T between a rear surface of the housing and a rear of volume 120 defined by trigger guard 110. Examples are discussed herein, e.g., with reference to Table 1 and FIGS. 1 and 3.

In some examples, mounting portion 202 is joinable to deterrent device 102 to position grip activation system 132 so that at least a portion of the sensing space 134, 512 is below the trigger guard 110. Examples are discussed herein, e.g., with reference to FIGS. 5 and 6.

In some examples, an accessory 100 for use with a deterrent device 102 includes a grip activation system 132 configured to perform operations as described herein with reference to any of FIGS. 10-13. Accessory 100 includes housing 116 supporting grip activation system 132 and having a mounting portion 202 joinable to the deterrent device 102 to position the grip activation system 132 so that the sensing space 134, 512 extends at least partly adjacent to a trigger guard 110 of the deterrent device 102. Accessory 100 further includes an activatable system 122 (e.g., at least laser module 124 or lamp 126) responsive to the activation signal described herein with reference to operations 1004, 1102, and 1308 from grip activation system 132.

In some examples, a kit comprises a grip activation system 132 configured to perform operations as described herein with reference to any of FIGS. 10-13. The kit includes a deterrent device 102 and a housing 116 supporting the grip activation system 132 and having a mounting portion 202. Mounting portion 202 is joinable to deterrent device 102 to position grip activation system 132 so that a sensing space 134, 512 of grip activation system 132 extends at least partly adjacent to a trigger guard 110 of deterrent device 102. In some examples, the kit can further include an activatable system 122 responsive to an activation signal from the grip activation system 132.

FIG. 11 is a flowchart illustrating an example process 1100 for controlling a grip-activation system 132. Process 1100 can be performed, e.g., by a control unit (e.g., controller 128 or processor 402) of grip activation system 132, e.g., in response to computer program instructions stored in data storage system 406. In some examples, operation 1002 can include operation 1102.

At 1102, the control unit can operate the emitter 136 and the detector 138 during a first time period. For example, the control unit can operate emitter 136 and detector 138 to detect an object 204, 602. Examples are discussed herein, e.g., with reference to FIGS. 1, 3, and 4. In some examples, operation 1102 can include triggering or otherwise operating emitter 136, triggering activation sensor 130 to cause it to perform a measurement sequence, as discussed herein with reference to FIG. 1 or 4.

At 1104, the control unit can remove power from at least one of (e.g., both of) the emitter 136 or the detector 138 during a second, different time period. This can increase battery life compared to continually operating emitter 136 or detector 138. Examples are discussed herein, e.g., with reference to FIG. 2, the "Illustrative Operations" subsection, and the "Further Examples" subsection.

FIG. 12 is a flowchart illustrating an example process 1200 for detecting an object 204, 602 in a sensing space 134, 512. Process 1200 can be performed, e.g., by a control unit (e.g., controller 128 or processor 402) of grip activation system 132, e.g., in response to computer program instructions stored in data storage system 406. In some examples, operation 1102 can be followed by, or include, operations 1202-1208. Accordingly, in some examples, operations 1202-1208 can be performed during the first time period described herein with reference to operation 1102.

At 1202, the control unit can operate the emitter 136 and the detector 138 to provide a first detection value. Examples are discussed herein, e.g., with reference to operation 1102.

At 1204, the control unit can determine that the first detection value satisfies a predetermined criterion (e.g., stored in or retrieved from configuration memory 410). Examples are discussed herein, e.g., with reference to FIGS. 4 and 5. For example, the control unit can compare the first detection value, or a magnitude thereof, with threshold level(s) or range(s) specified in the predetermined criterion. In some examples, the control unit is configured to not provide the activation signal in response to the determination at operation 1204. For example, transient motion through sensing space 134, 512, or reflection of sunlight of sequins or other rapidly-moving reflective objects, may cause a transient change in sensor data. Operations 1206 and 1208 can be used in response to the determination at operation 1204 to reduce the probability of incorrect activation of activatable system 122, or to increase the sensitivity (e.g., signal-to-noise ratio) of measured sensor data.

At 1206, the control unit can operate the emitter 136 and the detector 138 to provide a second detection value. Examples are discussed herein, e.g., with reference to operation 1202. Operation 1206 can be performed in response to the determination at operation 1204.

At 1208, the control unit can determine, based at least in part on the second detection value, whether or not the object 204, 602 is present in the sensing space. Examples are discussed herein, e.g., with reference to operations 1002 and 1204. For example, the control unit can compare the second detection value with the predetermined criterion, or with a second, different predetermined criterion. The control unit can determine that an object 204, 602 is present if and only if the second detection value satisfies the criterion or criteria against which the second detection value is being tested.

Figure 13:
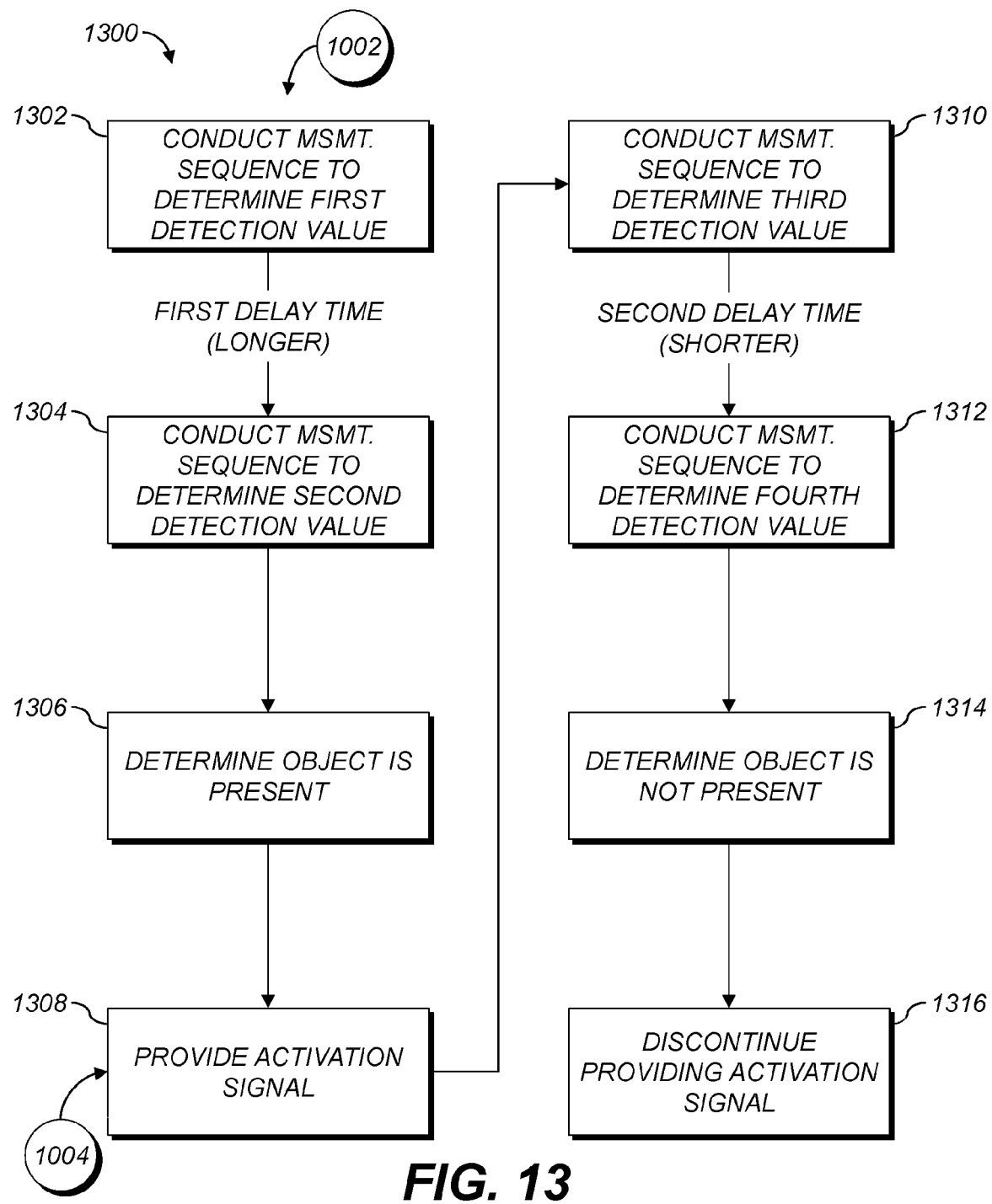
FIG. 13 is a flowchart of example processes for controlling an activatable system.

FIG. 13 is a flowchart illustrating an example process 1300 for controlling an activatable system 122. Process 1300 can be performed, e.g., by a control unit (e.g., controller 128 or processor 402) of grip activation system 132, e.g., in response to computer program instructions stored in data storage system 406. In some examples, operation 1002 can include operations 1302-1306; operation 1004 can include operation 1308; or operation 1002 or 1004 can be followed by operations 1310-1316.

At 1302, the control unit can conduct a first measurement sequence to determine a first detection value. Operation 1302 can include operating the emitter and the detector. Examples are discussed herein, e.g., with reference to operations 1102, 1202, and 1206.

At 1304, the control unit can conduct, at least a first delay time later, a second measurement sequence to determine a second detection value. The first delay time can be a time between measurement sequences in a low-power, idle, or storage mode. The first delay time can be stored in configuration memory 410. Examples are discussed herein, e.g., with reference to operation 1302. The control unit can conduct any number ≥0 of measurement sequences between operation 1302 and operation 1304.

At 1306, the control unit can determine that the second detection value indicates that the object 204, 602 is in the sensing space. Examples are discussed herein, e.g., with reference to operation 1302. In some examples, operations 1308-1316 can be performed in response to the determination at operation 1306.

At 1308, the control unit can provide the activation signal. Examples are discussed herein, e.g., with reference to operation 1004.

At 1310, the control unit can conduct a third measurement sequence to determine a third detection value. The control unit can conduct any number ≥0 of measurement sequences between operation 1308 and operation 1310. Examples are discussed herein, e.g., with reference to operation 1302.

At 1312, the control unit can conduct, at least a second delay time later, a fourth measurement sequence to determine a fourth detection value. In some examples, operation 1302. The second delay time can be less than the first delay time. The second delay time can be a time between measurement sequences in a high-power, active, or in-use mode.

At 1314, the control unit can determine that the fourth detection value indicates that the object 204, 602 is not in the sensing space. Examples are discussed herein, e.g., with reference to operation 1002 and 1208. For example, the control unit can test the fourth detection value against one or more predetermined criteria and determine that an object 204, 602 is not in the sensing space if the sensor data fails to satisfy the one or more predetermined criteria for object presence (or, as noted above, satisfies criteria for object absence, e.g., in examples using hysteresis).

At 1316, the control unit can discontinue providing the activation signal. Operation 1316 can be performed in response to the determination at operation 1314. Examples are discussed herein, e.g., with reference to FIG. 4 and operation 1004. Operation 1316 can include ceasing to provide a signal, or providing a signal indicating that activation should be discontinued.

In some examples, operations 1306 and 1314 use thresholds. Operation 1306 of determining that the second detection value indicates that the object 204, 602 is in the sensing space includes determining that the first detection value has a magnitude exceeding a first threshold. Examples are discussed herein, e.g., with reference to operation 1204. Operation 1314 of determining that the fourth detection value indicates that the object 204, 602 is not in the sensing space includes determining that the first detection value has a magnitude below a second threshold. The first threshold has a magnitude greater than a magnitude of the second threshold. This can provide hysteresis in the determination of activation as a function of sensor data, which can reduce flickering of lamps or other rapid on-off switching or activation/deactivation of activatable system 122.

In some examples, after operation 1316, the control unit can continue conducting measurement sequences separated by the second delay time until a predetermined cool-down time period has expired. After that, the control unit can conduct measurement sequences separated by the first delay time. This can provide more rapid response to user actions in situations in which deterrent device 102 is picked up and put down repeatedly over a relatively short period of time, while still increasing battery life compared to some examples using only the second delay time.

FIG. 14 is a flowchart illustrating an example process 1400 for preparing a deterrent device 102 for use.

At 1402, a housing 116 can be coupled to (e.g., mechanically mounted on, or affixed or otherwise joined to) a deterrent device 102. The housing 116 can support a grip activation system 132 configured to perform operations as described herein with reference to any of FIGS. 10-13. For example, housing 116 can be slid onto a rail 114. Housing 116 can additionally support activatable system 122, although this is not required.

At 1404, the housing 116 can be positioned so that so that a sensing space 134, 512 of the grip activation system 132 extends at least partly laterally adjacent to a trigger guard 110 of the deterrent device 102. For example, housing 116 can be seated against an end of rail 114. In some examples, operation 1404 can include adding a RAIL VISE or other positioner to the rail opposite housing 116 from trigger guard 110.

FIG. 15 is a flowchart illustrating example processes 1500 for configuring or operating a deterrent device. In some examples, at least: operation 1404 includes operation 1502, or operation 1404 is followed by operation 1504.

At 1502, housing 116 can be positioned so that sensing space 134, 512 is disjoint from a volume 120 defined by trigger guard 110. In some examples permitting rotation of housing 116, operation 1502 can include rotating housing 116 so that an optical axis (or other characteristics of or defining sensing space 134, 512) does not point towards trigger guard 110.

At 1504, a hand 506, or portion thereof, can be placed in the sensing space 134, 512 and outside volume 120 defined by trigger guard 110. For example, operation 1504 can include gripping or picking up deterrent device 102. In some examples, as discussed above, grip activation system 132 can activate activatable system 122 in response to detection of the hand 506 or portion thereof.

FIG. 16 is a flowchart illustrating an example process 1600 for activating an activatable system 122. Process 1600 can be performed, e.g., by a control unit (e.g., controller 128 or processor 402) of grip activation system 132, e.g., in response to computer program instructions stored in data storage system 406. In some examples, process 1600 (and process 1700, FIG. 17) can be embodied in or as at least one tangible, non-transitory computer-readable medium comprising instructions that, when executed by at least one processor, cause the at least one processor to perform the recited operations.

In some examples, a system includes at least one tangible, non-transitory computer-readable medium 416, e.g., a ROM, PROM, EPROM, EEPROM, Flash memory, or other nonvolatile memory device, storing instructions executable to cause at least one processor 402 to perform at least some (e.g., any of, or all of) operations of processes 1600 and 1700. The system includes the at least one processor 402 configured to execute at least some of the instructions stored on the at least one tangible, non-transitory computer-readable medium 416. The system includes an emitter 136 configured to emit first electromagnetic radiation having a first wavelength and a detector 138 configured to detect second electromagnetic radiation having the first wavelength. The system also includes a housing 116, e.g., as discussed herein with reference to any of FIG. 1-3, 5-7, 9, 10, or 14.

In some example of such systems, processor 402 and CRM 416 are disposed within housing 116. Emitter 136 is configured to emit the first electromagnetic radiation in response to a trigger signal provided as discussed herein with reference to operations 1606 and 1702. Detector 138 is configured to provide sensor data to be read at operation 1608. The sensor data quantifies the second electromagnetic radiation.

At 1602, the control unit can receive, via a user-operable control, an indication of a sensitivity level. Examples are discussed herein, e.g., with reference to control 418.

At 1604, the control unit can retrieve, from at least one processor-accessible memory, at least one activation criterion associated with the sensitivity level and at least one deactivation criterion associated with the sensitivity level. Examples are discussed herein, e.g., with reference to control 418 and FIG. 4.

At 1606, the control unit can provide a trigger signal to an optical proximity-detection sensor. For example, the control unit can trigger a measurement sequence as discussed herein with reference to FIG. 4.

At 1608, the control unit can receive, from the optical proximity-detection sensor, sensor data. Examples are discussed herein, e.g., with reference to FIG. 4. For example, the sensor data can include a digital (e.g., pulse-code modulated, PCM) value representing an amount of light detected by detector 138. Operation 1608 can be followed by operation 1610 or operation 1612, depending on the sensor data.

At 1610, the control unit can provide an activation signal commanding activation of an activatable system 122. Examples are discussed herein, e.g., with reference to operation 1004. Operation 1610 can be performed in response to the sensor data satisfying the at least one activation criterion. Examples are discussed herein, e.g., with reference to FIGS. 4, 10, and 12. In some examples, operation 1610 can include providing the activation signal by at least: changing a state of a relay; providing a digital-logic pulse on a digital-output pin communicatively connected with the processor; or changing a level of the digital-output pin.

At 1612, the control unit can provide the activation signal commanding deactivation of an activatable system. Operation 1612 can be performed in response to the sensor data satisfying the at least one deactivation criterion. Examples are discussed herein, e.g., with reference to operation 1610

FIG. 17 is a flowchart illustrating example processes 1700 for activating an activatable system 122. Processes 1700 can be performed, e.g., by a control unit (e.g., controller 128 or processor 402) of grip activation system 132, e.g., in response to computer program instructions stored in data storage system 406. In some examples, at least: operation 1606 includes operation 1702 (or vice versa); operation 1610 includes operation 1704; or operation 1612 includes operation 1612.

At 1702, the control unit can provide a plurality of trigger signals at a rate of five times per second or less. For example, the control unit can trigger measurement sequences spaced apart in time by a first delay time or a second delay time, as discussed herein with reference to FIG. 13.

In some examples, the at least one activation criterion discussed at operations 1604 and 1610 comprises a first digital value. The at least one deactivation criterion discussed at operations 1604 and 1612 comprises a second digital value. The sensor data discussed at operations 1608, 1610, and 1612 comprises a third digital value. Some of these examples include operations 1704 and 1706.

At 1704, the control unit can determining that the sensor data satisfies the at least one activation criterion at least partly by determining that the third digital value is greater than or equal to (or, in some examples, greater than; substantially greater than; or equal to or substantially greater than) the first digital value. Examples are discussed herein, e.g., with reference to operations 1306 and 1314.

At 1706, the control unit can determining that the sensor data satisfies the at least one deactivation criterion at least partly by determining that the third digital value is less than or equal to (or, in some examples, less than; substantially less than; or equal to or substantially less than) the second digital value. Examples are discussed herein, e.g., with reference to operations 1306 and 1314.

Some examples using operations 1704 and 1706 provide hysteresis. Examples are discussed herein, e.g., with reference to FIG. 13.

FIG. 18 is a front elevation 1800 of an accessory 1802 for a deterrent device 102, illustrated as a firearm. Components are as in FIG. 1, 2, or 6 except as noted. For brevity, some components are omitted or unlabeled. Accessory 1802 (which can represent accessory 100 or 500) includes activation sensor 1804 (which can represent activation sensor 130 or 504). When accessory 1802 is mounted to deterrent device 102, activation sensor 1804 is below, at least partly below, or at least partly below and at least partly in front of, trigger guard 110. In the illustrated example, when accessory 1802 is mounted to deterrent device 102, housing 1806 (which can represent housing 116) of accessory 1802 extends below trigger guard 110 and retains activation sensor 1804. In other examples, activation sensor 1804 is mounted below housing 1806 or otherwise extends at least partly below housing 1806.

Sensing space 1808 (which can represent sensing space 134 or 512) extends at least partly below trigger guard 110. Accordingly, activation sensor 1804 can detect presence of object 1810 (which can represent object 204 or 602) below trigger guard 110 or otherwise in sensing space 1808. Object 1810 can include, e.g., a user's middle finger. This can permit detecting a user's grip on deterrent device 102 even if the user has not yet put a finger to the trigger.

Figure 19A:
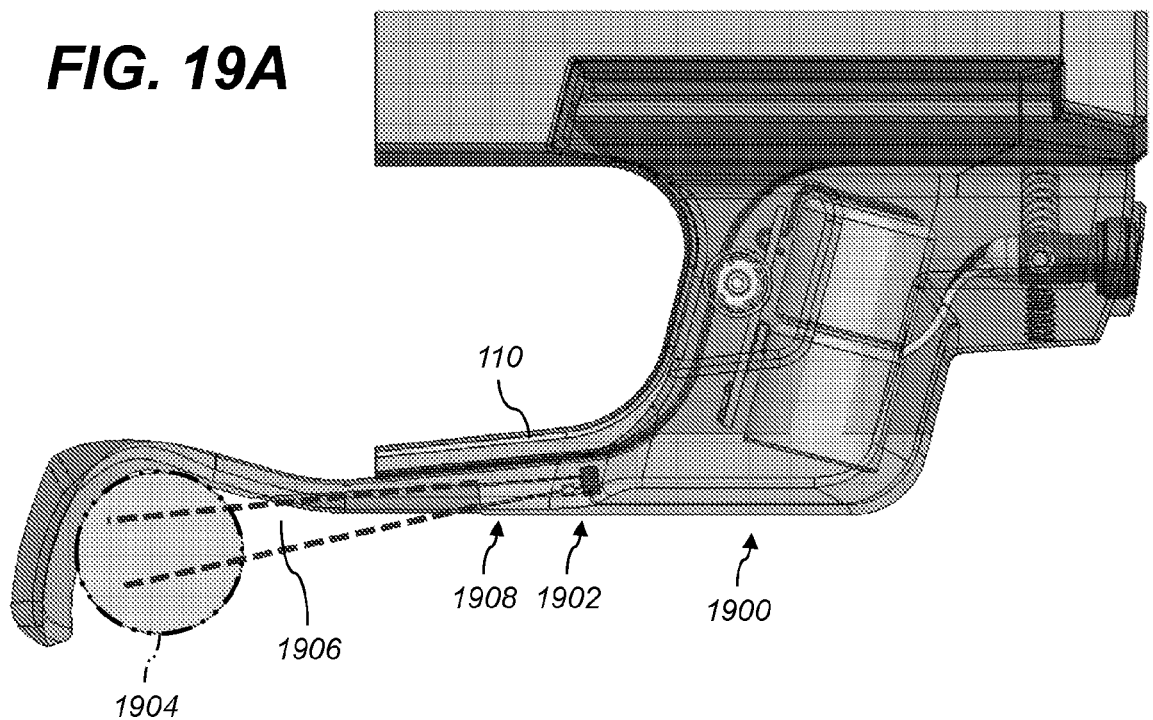
FIG. 19A is a side elevation of an accessory integrated with a trigger guard of a deterrent device.

FIG. 19A shows a side elevation of an accessory 1900 integrated with a trigger guard 110 of a deterrent device 102. Activation sensor 1902 (which can represent activation sensor 130, 504, or 1804) is configured to detect object 1904 (shown in phantom, and which can represent object 204, 602, or 1810) below trigger guard 110, in sensing space 1906 (which can represent sensing space 134, 512, or 1808). In the illustrated example, accessory 1900 includes light pipes 1908, e.g., as discussed herein with reference to FIGS. 8 and 9.

Figure 19B:
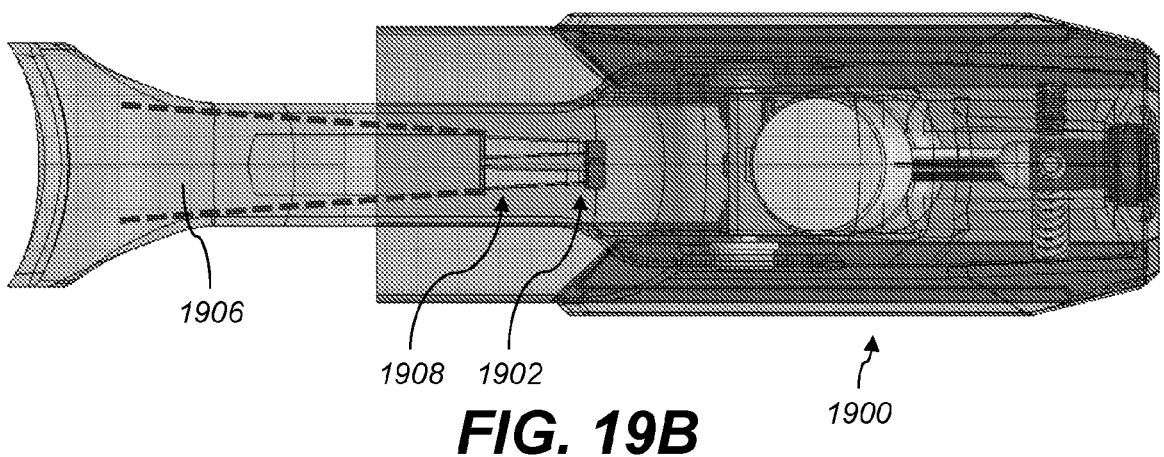
FIG. 19B is a bottom view of the accessory of FIG. 19A.

FIG. 19B shows a bottom view of the accessory 1900 shown in FIG. 19A.

Figure 20:
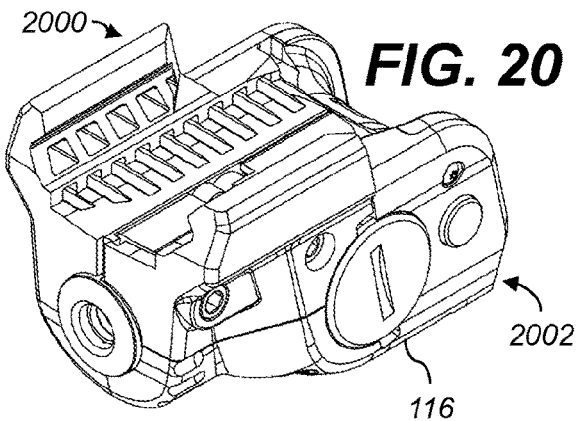
FIG. 20 is a top, front perspective of an example accessory.

FIG. 20 is a top, front perspective of an example accessory 2000. Angle 2002 in the depicted housing 116 can support an activation sensor 130, in some examples.

Figure 21:
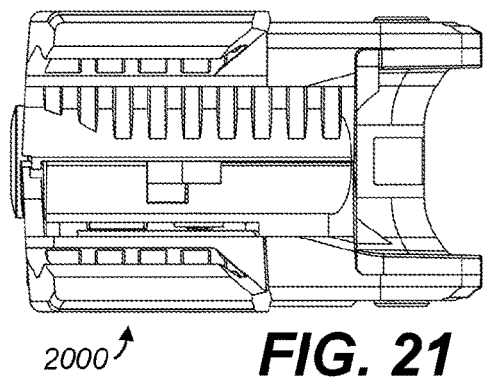
FIG. 21 is a top view of the example accessory of FIG. 20.

FIG. 21 is a top view of example accessory 2000.

Figure 22:
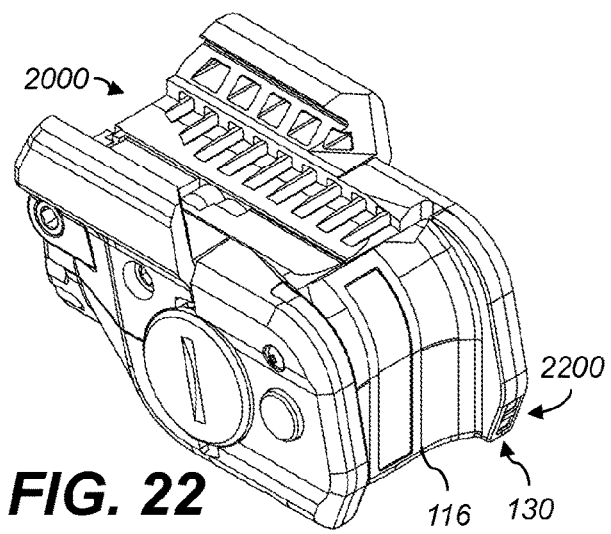
FIG. 22 is a top, rear perspective of the example accessory of FIG. 20.

FIG. 22 is a top, rear perspective of example accessory 2000. Activation sensor 130 is retained by housing 116. FIG. 22 also shows an angled portion 2200 of housing 116 in the vicinity of activation sensor 130.

Figure 23:
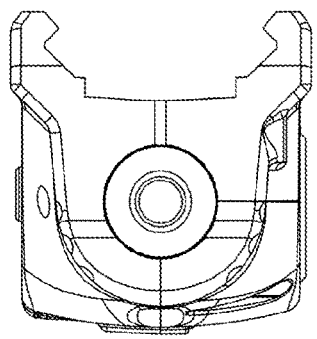
FIG. 23 is a front elevation of the example accessory of FIG. 20.

FIG. 23 is a front elevation of example accessory 2000.

Figure 24:
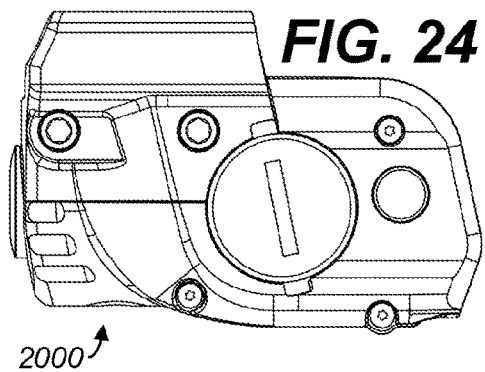
FIG. 24 is a left-side elevation of the example accessory of FIG. 20.

FIG. 24 is a left-side elevation of example accessory 2000.

Figure 25:
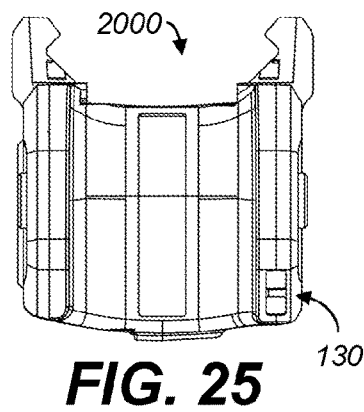
FIG. 25 is a rear elevation of the example accessory of FIG. 20.

FIG. 25 is a rear elevation of example accessory 2000 and shows activation sensor 130. In some examples, activation sensor 130 uses two light pipes, e.g., as discussed herein with reference to FIGS. 8 and 9.

Figure 26:
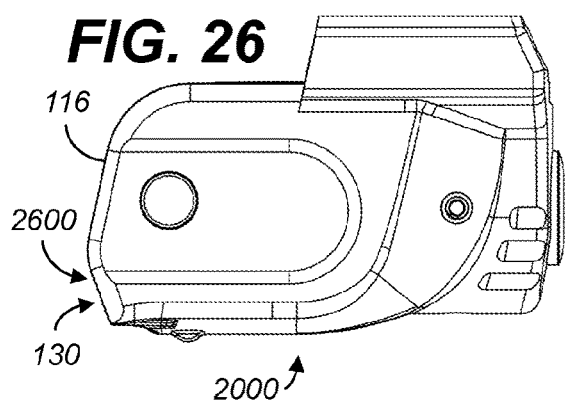
FIG. 26 is a right-side elevation of the example accessory of FIG. 20.

FIG. 26 is a right-side elevation of example accessory 2000 and shows activation sensor 130 in the vicinity of angled portion 2600 of housing 116.

Figure 27:
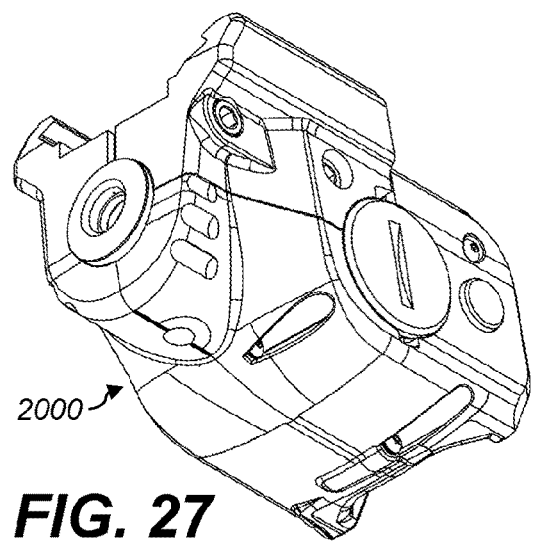
FIG. 27 is a bottom, front perspective of the example accessory of FIG. 20.

FIG. 27 is a bottom, front perspective of example accessory 2000.

Figure 28:
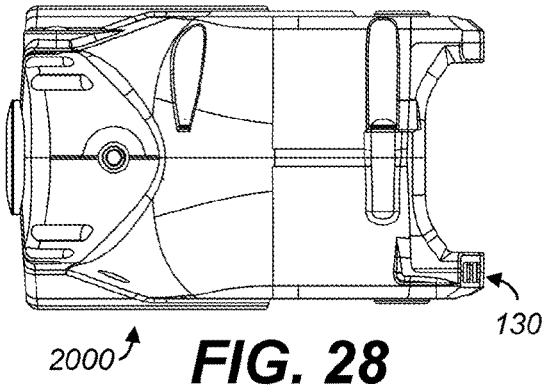
FIG. 28 is a bottom view of the example accessory of FIG. 20.

FIG. 28 is a bottom view of example accessory 2000 and shows activation sensor 130.

Figure 29:
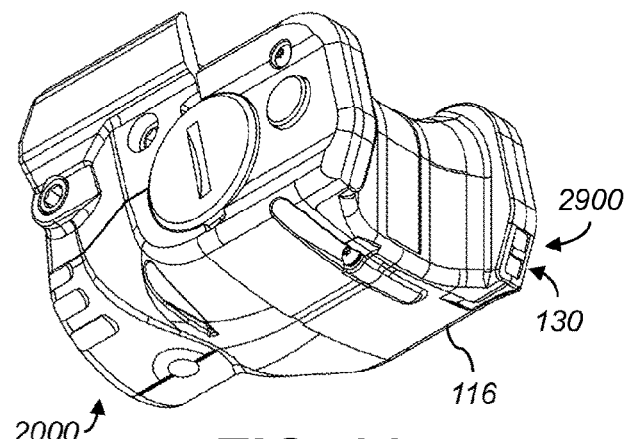
FIG. 29 is a bottom, rear perspective of the example accessory of FIG. 20.

FIG. 29 is a bottom, rear perspective of example accessory 2000 and shows activation sensor 130 in the vicinity of angled portion 2900 of housing 116.

Further Examples

Various of the above examples can be used in other configurations, and features described with regard to one type of example embodiment may be applicable to other types of example embodiments as well. The features discussed herein are not limited to the specific usage scenarios with respect to which they are discussed. For example, although deterrent device 102 has been shown as a hand gun, it is understood that accessory 100 or grip activation system 132 are not limited to use with handguns, but can be employed with any pistol, gun, bow, or rifle that selectively launches a projectile, whether by compressed gas, combustion, or electromagnetic actuation. It will be appreciated that that embodiments may take the forms useful with simulated firearms such as a weapon-shaped training device, or other grip-controlled devices, such as those that emit directed electromagnetic, fluidic and sonic outputs, and models and simulators thereof. Accessory 100 or grip activation system 132 may be used with non-firearm products having a grip 112.

Accessory 100 has been described in embodiments herein as projecting a laser beam, e.g., for sighting a target. However, this is not limiting and accessory 100 may perform other functions and include components configured to perform functions including, but not limited to, any electronic, electromechanical, electro-optical, or optical function. Example functions include, but are not limited to, image capture, visible illumination, non-visible but machine-detectable illumination, non-lethal deterrent operations (e.g., pepper spray), audio and video recording, and digital data capture, processing and storage. In some examples, system 400 can include additional components, e.g., image sensors, gyroscopes, or accelerometers that are communicatively connected with processor 402.

In some examples, activation sensor 130, grip activation system 132, or system 400 may be separately joinable or otherwise communicatively connectable to accessory 100 such that an accessory 100 may be sold without these components but may allow accessory 100 to be joined to these components if desired. Optionally, in some embodiments, a separate housing may be provided for these components. For example, grip activation system 132 can be contained in a first rail-mountable housing 116, and activatable system 122 can be contained in a second rail-mountable housing. These examples allow generic rail-mountable deterrent-device accessories to be joined with grip activation systems 132 that are adapted for use with the unique shapes of particular deterrent devices 102 or components thereof. A modular grip activation system 132 can be provided as an aftermarket product for integration with existing electronic devices that are adapted for integration with such products. In some examples, a grip activation system 132 can be connected, e.g., in a wired or wireless manner, to multiple activatable systems 122, so that the multiple activatable systems 122 can be activated concurrently, successively, or selectably by the grip activation system 132.

Additionally, it will be understood that there are a wide variety of rail mountable lasers that have ports for receiving switch inputs from external activation switches such as pressure switches. In embodiments, grip activation system 132 can be provided as a unit with an output that is designed to be connected to such ports and used to send signals that mimic those of the conventional pressure switch.

In some examples, controller 128 is commercially available and sold in conjunction with activatable system 122. In other configurations, custom-designed and -built boards and components may be used for controller 128.

In some examples, accessory 100, or portions thereof (e.g., grip activation system 132 or activatable system 122) can be: removably attachable to rail 114; incorporated into rail 114; attachable to trigger guard 110; incorporated into trigger guard 110; attachable to frame 106; or incorporated into frame 106. In some examples, accessory 100, or portions thereof, can receive power via power connector(s) in rail 114, instead of or in addition to via batteries in or connected with accessory 100. In some examples, grip activation system 132 or activatable system 122 can be integrated into a scope, HUD, or other deterrent-device accessory. For example, a rail-mounted grip activation system 132 can activate an activatable system 122 integrated into a HUD.

In various examples, accessory 100 (or grip activation system 132) is mounted externally to deterrent device 102, e.g.: on trigger guard 110 or barrel 104; integrated into a front or rear sight (e.g., a scope, heads-up display, HUD, or iron (fixed, non-magnified) sights; or integrated into a silencer foregrip, forestock, or other external component. In some of those examples, any of those types of sights, or accessory 100, can be removably mountable to deterrent device 102 In some examples, accessory 100 (or grip activation system 132) is integrated into, e.g.: a slide; a grip 112; a trigger guard 110; a stock; a scope, HUD or iron sights; or a silencer. In some examples, accessory 100 (or grip activation system 132) is integrated into a grip or partial frame, such as a BERETTA PICO chassis.

In one configuration, housing 116 is formed of mating halves. Additionally or alternatively, housing 116 can be formed as a single integral component or from a multitude of interconnected components. Housing 116 can be injection molded out of an elastomer such as a glass-filled nylon, e.g., a nylon 6.6 compound reinforced with 33% glass fiber, suitable for processing by injection molding, wherein the material is lubricated for ease of mold release.

Laser module 124 may be a commercially available assembly or may be manufactured or fabricated for specific purposes or use in particular applications. Depending on the construction of laser module 124 and housing 116, at least one of laser module 124 and housing 116 has a window through which a beam of light from laser module 124 can pass while providing a contained environment within accessory 100 or laser module 124. The window may be designed with a material and thickness that will have no substantial impact on a laser beam passing through window. Additionally or alternatively, the window may be adapted to optically modify light passing through the window. For example, the window may include a lens providing optical power or otherwise impacting beam characteristics including, but not limited to, shaping the beam, focusing the beam or polarizing the beam. Laser module 124 may also include a power supply and a control board. An example laser module 124 includes, but is not limited to, a red laser at 650 nm with an output power of 3.5 to 4.8 mW when powered by a 3-volt lithium battery or two 3V lithium batteries. In other embodiments laser module 124 may emit coherent light at other wavelengths including, but not limited to, infrared wavelengths between 2.5 nm and 20 nm and ultraviolet wavelengths below 500 nm and may for example use laser emitters such as $CO_2$ lasers and quantum cascade lasers or ICC lasers to create emissions in these wavelengths.

In some examples, activatable system 122 includes multiple activatable components, e.g., laser module 124 and lamp 126. Some examples permit the user to configure which activatable component(s) are activate in response to detection of object 204, 602 in sensing space 134. For example, pushbutton presses or DIP or rotary switch settings can be used to select the mode. In some examples, accessory 100 is configured to provide, as modes, at least two elements of the following list of combinations: any of {laser off, laser steady, laser pulsing} with any of {light off, light steady, light pulsing}.

Deterrent device 102 can include a deterrence system which generally can be anything that might present a risk of physical consequences and that might deter an attack. Deterrence system can be a projectile launcher which can be, but is not limited to, a pistol, a rifle, shotgun, revolver or other form of firearm, a cross-bow, a compressed air weapon, a chemical irritant disperser, a non-lethal projectile launcher, or a directed energy weapon such as device that emits a sonic, optical or electrical discharge alone or in combination with a projectile. Such as deterrence system may include any other device that may be likely to cause a person confronted with such a person wielding a deterrent device 102 to be less likely to engage in an aggressive act.

Activatable system 122 can include one or more device(s) that assist the user of deterrent device 102 when using deterrent device 102. The assistance can take the form of providing any type of electronically controlled assistance or help that may be useful in the operation of deterrent device 102. In embodiments this may take the form of providing aiming assistance, communication, weapon stabilization, targeting information, image enhancement, location information, direction information, shot counting, shots remaining, a targeting reticle, aiming and targeting information, presenting images to the user containing information which may include visual information (including, but not limited to, via a video display such as an LCD, OLED, reflective, emissive, or holographic display), or presenting a view of a target via a scope with an electronic display that presents images in visible wavelengths of light that have been captured in wavelengths of light that are not readily visible to a human eye, such as at ultraviolet, near-infra red, mid-wave infrared and long wave infrared wavelengths of light. Activatable systems 122 can include image capture devices, holographic sights, heads up displays, scopes and sensor packages including but not limited to sonic sensors, orientation sensors, chemical sensors, orientation sensors, accelerometers, thermal sensors, voltage sensors, electromagnetic field sensors, or radiological sensors, or any other kind of portable electronic system of any type or purpose that may be desired to provide to assist a user of a deterrent device 102 in using the deterrent device.

In embodiments the assistance may take the form of activating a transponder in the electronic device, providing video or audio communications, or capturing images, video, or audio. In still other embodiments, the assistance may take the form of determining and or providing information about the status of the deterrent device such as rounds remaining, safety activation status, and any other information useful in operating deterrent device 102. In further embodiments, the assistance may take the form of pre-activating or activating supplemental deterrent devices such as non-lethal deterrents such as chemical or other deterrent emitters provided in device 102. It will be appreciated that these embodiments are not limiting.

In an example embodiment, laser module 124 may comprise, for example, one or more of a green laser, a red laser, an infrared laser, an infrared light emitting diode ("LED"), a white and colored LED, a laser having an output of approximately 5 mW (it is understood that lasers having an output greater than approximately 5 mW or less than approximately 5 mW may also be used), and a short wavelength infrared laser ("SWIR"). It is understood that a SWIR may emit a signal, beam, pulse, and/or other radiation having a wavelength of between, approximately 0.9 μm and approximately 2.5 μm. In other embodiments laser module 124 may emit coherent light at other wavelengths including, but not limited to, infrared wavelengths between 2.5 nm and 20 nm and ultraviolet wavelengths below 500 nm and may for example use laser emitters such as $CO_2$ lasers and quantum cascade lasers or ICC lasers to create emissions in these wavelengths.

Lamp 126 can include a light emitter and driving circuitry adapted to cause the light emitter to emit a light that may have a greater divergence than the light emitted by laser module 124, so as to provide some ability to perceive the environment around a point where the laser is emitted. Lamp 126 may take the form of an incandescent, fluorescent, semi-conductor, or organic article or mechanism that emits light when supplied with operating energy and activated by controller 128.

For example, lamp 126 can include a light emitting diode that emits, for example, coherent or incoherent light. Such light may be in the visible wavelengths such as between about 390 and 700 nm and it may be outside of such visible wavelengths such that the illumination light must be observed or detected using imagers or detectors appropriate for sensing light in such wavelengths and equipment for converting such light into visible wavelengths that can be observed. Lamp 126 may also include other systems such as reflectors to reflect light out of an opening in housing 116, optical components to affect or direct the emitted light (e.g., filters or light pipes), or thermal management systems such as materials and systems that move heat away from a light emitter to other parts of activatable system 122, into accessory 100, into deterrent device 102, or into an environment surrounding electronic device 102.

Additionally or alternatively, activatable system 122 can include component(s) that control or affect operation of deterrent device 102. For example, activatable system 122 can include a lockout mechanism, e.g., that prevents release of a crossbow string when deactivated. Additionally or alternatively, activatable system 122 can permit a mechanical safety to be adjusted (e.g., released) only when activated, or only when deactivated.

In some examples, activatable system 122 is connected to multiple grip activation systems 132 and is configured to activate only if all of the grip activation systems 132 command activation. For example, two grip activation systems 132 can be used, one for each hand, to detect proper positioning of both hands of a user operating deterrent device 102.

In some examples, an accessory 100 or 500, or other embodiment of grip activation system 132, is used with a deterrent device 102 that can be carried in a holster. A "sensable portion" is at least a portion of such a holster that, when deterrent device 102 is holstered and accessory 100, 500 installed on deterrent device 102, protrudes into or is otherwise within sensing space 134, 512 of grip activation system 132, 502. In some examples, a holster excludes sensable portions, i.e., has no portion meeting the definition of a "sensable" portion above. In some examples, a holster includes one or more sensable portion(s) having <50% optical reflectivity at least at a wavelength emitted by emitter 136. For example, the sensable portion(s) can include cloth (e.g., Duvetyne), or can include light-absorbent fibers (textile or otherwise) in a matrix (e.g., fiberglass or other).

In some examples, one or more sensable portions of (e.g., all sensable portions of) a holster have a predetermined color (e.g., a chromakey color or a color not in Pointer's collection of real-world surface colors). In some examples, gripactivation system 132, 502 includes a color sensor (e.g., a visible-light emitter and RGB-filtered photodiodes). When the color sensor detects the predetermined color, processor 402 deactivates the activatable system. Examples in this paragraph and the preceding paragraph can reduce the probability of unnecessary activation while holstered, and therefore can increase battery life.

In some examples, at least a portion of deterrent device 102 on the same side of deterrent device 102 as sensing space 134, 512 (e.g., the +Z size in FIGS. 2 and 6) has reduced optical reflectivity or a predetermined color, as described above with reference to sensable portions of a holster. For example, a frame of deterrent device 102 can have a black or dark-earth color. This can reduce stray-light reflection of light from emitter 136 off deterrent device 102 to detector 138.

In some examples, activation or deactivation criteria stored in configuration memory 410 are determined empirically for particular combinations of accessory 100 (or housing 116) and deterrent device 102. This can increase the accuracy of grip detection. In some examples, activation or deactivation criteria stored in configuration memory 410 are determined empirically for particular accessories 100 or housings 116. This can reduce the storage required for calibration data.

In some examples, activatable system 122 is or includes a scope (e.g., an illuminated-reticle, night-vision, or thermal-imaging scope). In some examples, housing 116 is mounted on deterrent device 102, e.g., a rifle, so that a user's head is at least partly within sensing space 134, 512 when in the normal position of operating deterrent device 102. For example, housing 116 can be mounted on a top or side rail of deterrent device 102. This configuration can permit activating the scope (activatable system 122) when the user prepares to shoot, without requiring the user to perform a separate activation operation.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

- A: A grip activation system, substantially as shown and described herein, and equivalents thereof, for an accessory of a deterrent device.
- B: An accessory of a deterrent device, the accessory comprising a grip activation system, substantially as shown and described herein, and equivalents thereof.
- C: A deterrent device comprising at least one of: a grip activation system as in paragraph A, or an accessory as in paragraph B.
- D: A system as substantially shown and described herein, and equivalents.
- E: A method for detecting an object in a sensing space adjacent to a deterrent device, the method as substantially shown and described herein, and equivalents thereof.
- F: An electronic device for use with a deterrent device and an activatable system, the electronic device comprising: a grip activation system configured to detect presence of an object in a sensing space, the grip activation system comprising: an emitter configured to emit first electromagnetic radiation having a first wavelength; a detector configured to detect second electromagnetic radiation having the first wavelength; and a controller configured to: determine, based at least in part on the second electromagnetic radiation, that an object is present in the sensing space; and provide an activation signal to the activatable system in response to determining that the object is present in the sensing space; and a housing supporting the grip activation system and having a mounting portion, the mounting portion joinable to the deterrent device to position the grip activation system so that the sensing space extends at least partly laterally adjacent to a trigger guard of the deterrent device.
- G: The electronic device according to paragraph F, wherein the first wavelength is between six hundred fifty nm and one mm.
- H: The electronic device according to paragraph F or G, wherein the grip activation system is configured to determine that at least some of the second electromagnetic radiation originated as part of the first electromagnetic radiation and then reflected off of a surface of the object.
- I: The electronic device according to any of paragraphs F-H, wherein the mounting portion is joinable to the deterrent device to position the grip activation system so that the sensing space is disjoint from a volume defined by the trigger guard.
- J: The electronic device according to any of paragraphs F-I, wherein the mounting portion is joinable to the deterrent device to position the grip activation system so that the grip activation system detects an object moving towards a volume defined by the trigger guard before the object enters the volume.
- K: The electronic device according to any of paragraphs F-J, wherein the mounting portion is joinable to the deterrent device to position the grip activation system so that a rearward extent of the sensing space is shorter than a distance between a rear surface of the housing and a rear of a volume defined by the trigger guard.
- L: The electronic device according to any of paragraphs F-K, wherein the mounting portion is joinable to the deterrent device to position the detector forward of the trigger guard.
- M: The electronic device according to any of paragraphs F-L, wherein the grip activation system is configured to: emit a plurality of pulses of the first electromagnetic radiation during a measurement sequence; and perform a measurement sequence at most five times per second.
- N: The electronic device according to any of paragraphs F-M, wherein the controller is configured to: operate the emitter and the detector during a first time period to detect the object; and remove power from at least one of the emitter or the detector during a second, different time period.
- O: The electronic device according to paragraph N, wherein the controller is configured to, during the first time period: operate the emitter and the detector to provide a first detection value; determine that the first detection value satisfies a predetermined criterion; in response, operate the emitter and the detector to provide a second detection value; and determine, based at least in part on the second detection value, whether or not the object is present in the sensing space.
- P: The electronic device according to any of paragraphs F-O, wherein: the mounting portion is configured to mount to a rail of the deterrent device; and the mounting portion is joinable to the deterrent device to position the grip activation system so that at least one of the emitter or detector is positioned rearward of a rear end of the rail.
- Q: The electronic device according to any of paragraphs F-P, wherein the grip activation system comprises a shroud associated with the emitter or the detector.
- R: The electronic device according to paragraph Q, wherein the shroud comprises a cavity through which the first electromagnetic radiation or the second electromagnetic radiation passes.
- S: The electronic device according to any of paragraphs F-R, further comprising the activatable system, wherein the activatable system comprises a light source.
- T: The electronic device according to any of paragraphs F-S, wherein the grip activation system is configured to, in order: conduct a first measurement sequence to determine a first detection value, the conducting comprising the first measurement sequence comprising operating the emitter and the detector; at least a first delay time later, conduct a second measurement sequence to determine a second detection value; determine that the first detection value indicates that the object is in the sensing space; in response: provide the activation signal; conduct a third measurement sequence to determine a third detection value, at least a second delay time, and less than the first delay time, later, conduct a fourth measurement sequence to determine a fourth detection value; determine that the fourth detection value indicates that the object is not in the sensing space; and in response, discontinue providing the activation signal.

U: The electronic device according to paragraph T, wherein: determining that the first detection value indicates that the object is in the sensing space comprises determining that the first detection value has a magnitude exceeding a first threshold; determining that the fourth detection value indicates that the object is not in the sensing space comprises determining that the first detection value has a magnitude below a second threshold; and the first threshold has a magnitude greater than a magnitude of the second threshold.

V: The electronic device according to any of paragraphs F-U, wherein the mounting portion is joinable to the deterrent device to position the grip activation system so that the sensing space is at least partly below the trigger guard.

W: An accessory for use with a deterrent device, the accessory comprising: a grip activation system as recited in any of paragraphs A-V; a housing supporting the grip activation system and having a mounting portion, the mounting portion joinable to the deterrent device to position the grip activation system so that the sensing space extends at least partly adjacent to a trigger guard of the deterrent device; and an activatable system responsive to the activation signal from the grip activation system.

X: The accessory according to paragraph W, wherein the activatable system comprises at least one of a laser or a lamp.

Y: An electronic device comprising: a grip activation system configured to detect presence of an object in a sensing space, the grip activation system comprising: an emitter configured to emit first electromagnetic radiation having a first wavelength; a detector configured to detect second electromagnetic radiation having the first wavelength; and a controller configured to: determine, based at least in part on the second electromagnetic radiation, that an object is present in the sensing space; and provide an activation signal to an activatable system in response to determining that the object is present in the sensing space; and a housing supporting the grip activation system and having a mounting portion, the mounting portion joinable to a deterrent device to position the grip activation system so that the sensing space extends at least partly laterally adjacent to a trigger guard of the deterrent device.

Z: The electronic device according to paragraph Y, further comprising: a first light pipe configured to direct light from the emitter towards the sensing space; and a second light pipe configured to direct light from the sensing space toward the detector.

AA: The electronic device according to paragraph Y or Z, wherein the first wavelength is between six hundred fifty nm and one mm.

AB: The electronic device according to any of paragraphs Y-AA, wherein the mounting portion is joinable to the deterrent device to position the grip activation system so that the sensing space is disjoint from a volume defined by the trigger guard.

AC: The electronic device according to any of paragraphs Y-AB, wherein: the mounting portion is joinable to the deterrent device to position the grip activation system so that the sensing space is at least partly outside a volume defined by the trigger guard; and the controller is configured to detect an object moving through the sensing space towards the volume defined by the trigger guard before the object enters the volume defined by the trigger guard.

AD: The electronic device according to any of paragraphs Y-AC, wherein the mounting portion is joinable to the deterrent device to position the grip activation system so that a rearward extent of the sensing space is shorter than a distance between a rear surface of the housing and a rear of a volume defined by the trigger guard.

AE: The electronic device according to any of paragraphs Y-AD, wherein the controller is configured to: operate the emitter and the detector during a first time period; and remove power from at least one of the emitter or the detector during a second, different time period.

AF: The electronic device according to paragraph AE, wherein the controller is configured to, during the first time period: operate the emitter and the detector to provide a first detection value; determine that the first detection value satisfies a predetermined criterion; in response, operate the emitter and the detector to provide a second detection value; and determine, based at least in part on the second detection value, whether or not the object is present in the sensing space.

AG: The electronic device according to any of paragraphs Y-AF, further comprising the activatable system, wherein the activatable system comprises a light source.

AH: The electronic device according to any of paragraphs Y-AG, wherein the grip activation system is configured to: conduct a first measurement sequence to determine a first detection value, the conducting comprising the first measurement sequence comprising operating the emitter and the detector; at least a first delay time later, conduct a second measurement sequence to determine a second detection value; determine that the second detection value indicates that the object is in the sensing space; and in response: provide the activation signal; conduct a third measurement sequence to determine a third detection value, at least a second delay time later, conduct a fourth measurement sequence to determine a fourth detection value, wherein the second delay time is less than the first delay time; determine that the fourth detection value indicates that the object is not in the sensing space; and in response, discontinue providing the activation signal.

AI: The electronic device according to paragraph AH, wherein: determining that the second detection value indicates that the object is in the sensing space comprises determining that the first detection value has a magnitude exceeding a first threshold; determining that the fourth detection value indicates that the object is not in the sensing space comprises determining that the first detection value has a magnitude below a second threshold; and the first threshold has a magnitude greater than a magnitude of the second threshold.

AJ: The electronic device according to any of paragraphs Y-AI, wherein the mounting portion is joinable to the deterrent device to position the grip activation system so that at least a portion of the sensing space is below the trigger guard.

AK: An accessory for use with a deterrent device, the accessory comprising: a grip activation system as recited in any of paragraphs Y-AJ; a housing supporting the grip activation system and having a mounting portion, the mounting portion joinable to the deterrent device to position the grip activation system so that the sensing space extends at least partly adjacent to a trigger guard of the deterrent device; and an activatable system responsive to the activation signal from the grip activation system.

AL: The accessory according to paragraph AK, wherein the activatable system comprises at least one of a laser or a lamp.

AM: A kit, comprising: a grip activation system as recited in any of paragraphs Y-AJ; a deterrent device; and a housing supporting the grip activation system and having a mounting portion, the mounting portion joinable to the deterrent device to position the grip activation system so that a sensing space of the grip activation system extends at least partly adjacent to a trigger guard of the deterrent device.

AN: The kit according to paragraph AM, further comprising an activatable system responsive to an activation signal from the grip activation system.

AO: A method, comprising: coupling a housing to a deterrent device, the housing supporting a grip activation system as recited in any of paragraphs Y-AJ; and positioning the housing so that so that a sensing space of the grip activation system extends at least partly laterally adjacent to a trigger guard of the deterrent device.

AP: The method according to paragraph AO, further comprising positioning the housing so that the sensing space is disjoint from a volume defined by the trigger guard.

AQ: The method according to paragraph AO or AP, further comprising placing a hand, or portion thereof in the sensing space and outside a volume defined by the trigger guard.

AR: At least one tangible, non-transitory computer-readable medium comprising instructions that, when executed by at least one processor, cause the at least one processor to perform operations comprising: receiving, via a user-operable control, an indication of a sensitivity level; retrieving, from at least one processor-accessible memory, at least one activation criterion associated with the sensitivity level and at least one deactivation criterion associated with the sensitivity level; providing a trigger signal to an optical proximity-detection sensor; receiving, from the optical proximity-detection sensor, sensor data; in response to the sensor data satisfying the at least one activation criterion, providing an activation signal commanding activation of an activatable system; and in response to the sensor data satisfying the at least one deactivation criterion, providing the activation signal commanding deactivation of an activatable system.

AS: The at least one tangible, non-transitory computer-readable medium according to paragraph AR, wherein: the at least one activation criterion comprises a first digital value; the at least one deactivation criterion comprises a second digital value; the sensor data comprises a third digital value; and the operations comprise: determining that the sensor data satisfies the at least one activation criterion at least partly by determining that the third digital value is greater than or equal to the first digital value; and determining that the sensor data satisfies the at least one deactivation criterion at least partly by determining that the third digital value is less than or equal to the second digital value.

AT: The at least one tangible, non-transitory computer-readable medium according to paragraph AR or AS, the operations comprising providing a plurality of trigger signals at a rate of five times per second or less.

AU: The at least one tangible, non-transitory computer-readable medium according to any of paragraphs AR-AT, the operations for providing the activation signal comprising at least: changing a state of a relay; providing a digital-logic pulse on a digital-output pin communicatively connected with the processor; or changing a level of the digital-output pin.

AV: A system, comprising: at least one tangible, non-transitory computer-readable medium storing instructions executable to cause at least one processor to perform operations according to any of paragraphs AR-AU; the at least one processor configured to execute at least some of the instructions stored on the at least one tangible, non-transitory computer-readable medium; an emitter configured to emit first electromagnetic radiation having a first wavelength; a detector configured to detect second electromagnetic radiation having the first wavelength; and a housing according to any of paragraphs Y-AN, wherein: the processor and the at least one tangible, non-transitory computer-readable medium are disposed within the housing; the emitter is configured to emit the first electromagnetic radiation in response to the trigger signal; and the detector is configured to provide the sensor data quantifying the second electromagnetic radiation.

49: An accessory substantially as shown and described in FIGS. 1 and 2; FIGS. 5 and 6; FIG. 9; FIG. 18; or FIGS. 19A-19B.

AX: A computer-readable medium, e.g., a computer storage medium, having thereon computer-executable instructions, the computer-executable instructions upon execution configuring a computer to perform operations as any of paragraphs A-AV recites.

AY: A device comprising: a processor; and a computer-readable medium, e.g., a computer storage medium, having thereon computer-executable instructions, the computer-executable instructions upon execution by the processor configuring the device to perform operations as any of paragraphs A-AV recites.

AZ: A system comprising: means for processing; and means for storing having thereon computer-executable instructions, the computer-executable instructions including means to configure the system to carry out a method as any of paragraphs A-AV recites.

BA: A method comprising performing operations as any of paragraphs A-AV recites.

BB: At least one feature selected from each of two or more of the following groups: paragraph A; paragraph B; paragraph C; paragraph D; paragraph E; paragraphs F-V; paragraphs W-X; paragraphs Y-AJ; paragraphs AK-AL; paragraphs AM-AN; paragraphs AO-AQ; paragraphs AR-AU; paragraph AV; or paragraph AW.

BC: An accessory substantially as shown in and described with reference to any of FIG. 9; FIGS. 19A and 19B; or FIGS. 20-29.

BD: The ornamental design for a deterrent-device accessory substantially as shown in and described with reference to any of FIG. 9; FIGS. 19A and 19B; or FIGS. 20-29.

BE: The ornamental design for a grip-activation system substantially as shown in and described with reference to any of FIG. 9; FIGS. 19A and 19B; or FIGS. 20-29.

BF: The ornamental design for a grip sensor substantially as shown in and described with reference to any of FIG. 9; FIGS. 19A and 19B; or FIGS. 20-29.

CONCLUSION

Using optical detection can permit detecting object 204 without reference to, e.g., the electrostatic or magnetic properties of object 204. For example, a gloved finger can be detected regardless of the type, composition, or thickness of the glove. Some examples detect gloves more effectively than bare fingers, since the surface of the glove is closer to activation sensor 130 than the surface of the finger. Moreover, various examples permit detecting object 204 without regard to levels of humidity or moisture in the air around accessory 100. Various examples include loading values into configuration memory 410 during manufacturing, so that no user calibration or adjustment is required. A technical effect of various examples is to detect an object 204 physically positioned within a sensing space 134, and to activate an activatable system 122 in response to the detection.

In various examples described and claimed herein, activation, deactivation and other decisions relating to the operation of activatable system 122 are made by controller 128 based upon changes in reflected light and not based upon, or maintained based upon, mechanical contact, switch closure, resistance measurements, capacitance measurements, or other measurements of force or electrical properties.

This disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Many variations and modifications can be made to the above-described examples, the elements of which are to be understood as being among other acceptable examples. All such modifications and variations are intended to be included herein within the scope of this disclosure and protected by the following claims.

What is claimed is:

1. An electronic device comprising:
  a housing including a mounting portion for removably coupling the electronic device to a housing of a deterrent device such that a sensing space is positioned proximate to at least one of a grip of the deterrent device or an exterior surface of a trigger guard of the deterrent device, the housing of the electronic device being separate from the housing of the deterrent device;
  a processor; and
  a non-transitory computer-readable medium storing instructions that, when executed, cause the processor to perform operations comprising:
    receiving sensor data from a sensor system carried by the housing of the electronic device, the sensor system being positioned such that the sensing space extends, from the housing of the electronic device, to a location external to the housing of the electronic device and in a direction toward the grip of the deterrent device;
    determining, based at least in part on the sensor data, a presence of an object within at least a portion of the sensing space; and
    causing activation of an activatable system responsive to determining the presence of the object.

2. The electronic device of claim 1, the operations further comprising:
receiving additional sensor data from the sensor system;
determining, based at least in part on the additional sensor data, an absence of the object within the sensing space; and
causing deactivation of the activatable system responsive to determining the absence of the object.

3. The electronic device of claim 1, wherein the activatable system is continuously activated during a period of time in which the sensor data indicates the presence of the object.

4. The electronic device of claim 1, wherein determining the presence of the object comprises:
determining, based at least in part on the sensor data, a detection value associated with the sensing space; and
determining the presence of the object, based at least in part on a determination that the detection value meets or exceeds a threshold.

5. The electronic device of claim 1, wherein the sensor system comprises:
an emitter configured to emit a first electromagnetic radiation; and
a detector configured to detect a second electromagnetic radiation,
wherein the first electromagnetic radiation and the second electromagnetic radiation have a same wavelength.

6. The electronic device of claim 5, the housing further comprising:
a first light pipe for directing light from the emitter towards the sensing space; and
a second light pipe for directing light from the sensing space toward the detector.

7. The electronic device of claim 1, wherein the activatable system comprises at least one of a laser module or a lamp.

8. The electronic device of claim 1, wherein the sensing space is below a volume defined by the trigger guard of the deterrent device, and adjacent to a grip of the deterrent device, the sensing space excluding the volume defined by the trigger guard.

9. The electronic device of claim 1, wherein the sensing space is disjointed from a volume defined by the trigger guard of the deterrent device.

10. The electronic device of claim 1, wherein the sensing space extends at least partly laterally adjacent to the trigger guard of the deterrent device.

11. A method comprising:
receiving, by a controller of an electronic device associated with a deterrent device, sensor data generated by a sensor of the electronic device, the sensor data associated with a sensing space that is positioned proximate to at least one of a grip of the deterrent device or an exterior surface of a trigger guard of the deterrent device,
the electronic device including a housing removably coupled to the deterrent device, and
the sensor being carried by the housing and positioned such that the sensing space extends, from the housing, to a location external to the housing and in a direction toward the grip of the deterrent device;
determining, by the controller and based at least in part on the sensor data, a presence of an object within at least a portion of the sensing space; and
activating, by the controller, an activatable system responsive to determining the presence of the object.

12. The method of claim 11, further comprising:
receiving, by the controller, additional sensor data from the sensor;
determining, by the controller and based at least in part on the additional sensor data, an absence of the object within the sensing space; and
deactivating, by the controller, the activatable system responsive to determining the absence of the object.

13. The method of claim 11, wherein the sensor is an optical proximity detection sensor.

14. The method of claim 11, wherein the controller continuously activates the activatable system during a period of time in which the sensor data indicates the presence of the object.

15. The method of claim 11, further comprising determining, by the controller and based at least in part on the sensor data, a detection value associated with the sensing space, wherein determining the presence of the object is based at least in part on a determination, by the controller, that the detection value meets or exceeds a threshold.

16. The method of claim 11, wherein the sensor is at least one of an emitter that is configured to emit a first electromagnetic radiation or a detector that is configured to detect a second electromagnetic radiation.

17. The method of claim 11, wherein the activatable system comprises at least one of a laser or a lamp.

18. The method of claim 11, wherein the sensing space is at least one of:
below a volume defined by the trigger guard of the deterrent device and adjacent to a grip of the deterrent device;
disjointed from the volume defined by the trigger guard of the deterrent device; or
laterally adjacent to the trigger guard of the deterrent device.

19. A system comprising:
a deterrent device; and
an electronic device configured to detachably couple to the deterrent device, the electronic device comprising:
a housing separate from the deterrent device;
one or more processors disposed within the housing; and
one or more non-transitory computer-readable media storing instruction that, when executed, cause the one or more processors to perform operations comprising:
receiving sensor data generated by a sensor carried by the housing, the sensor data associated with a sensing space that is positioned proximate to at least one of a grip of the deterrent device or an exterior surface of a trigger guard of the deterrent device, the sensor being positioned such that the sensing space extends, from the housing, to a location external to the housing and in a direction toward the grip of the deterrent device;
determining, based at least in part on the sensor data, a presence of an object within at least a portion of the sensing space; and
responsive to determining the presence of the object, activating an activatable system of the electronic device.

20. The system of claim 19, wherein the sensor is an optical proximity detection sensor and the sensing space is positioned at least one of:
  below a volume defined by the trigger guard of the deterrent device;
  disjoint from the volume defined by the trigger guard of the deterrent device; or
  laterally adjacent to the trigger guard of the deterrent device.

* * * * *